US012638789B2

(12) United States Patent
Tsujimoto et al.

(10) Patent No.: US 12,638,789 B2
(45) Date of Patent: May 26, 2026

(54) TONER AND TWO-COMPONENT DEVELOPER

(71) Applicant: CANON KABUSHIKI KAISHA, Tokyo (JP)

(72) Inventors: Daisuke Tsujimoto, Tokyo (JP); Toru Takahashi, Ibaraki (JP); Ryuichiro Matsuo, Ibaraki (JP); Shin Kitamura, Ibaraki (JP); Nobuyuki Fujita, Tokyo (JP); Ryuji Murayama, Chiba (JP); Hitoshi Sano, Chiba (JP); Takakuni Kobori, Ibaraki (JP); Yoshihiro Ogawa, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 434 days.

(21) Appl. No.: 18/307,828

(22) Filed: Apr. 27, 2023

(65) Prior Publication Data

US 2023/0408944 A1 Dec. 21, 2023

(30) Foreign Application Priority Data

Apr. 28, 2022 (JP) ................................ 2022-075101

(51) Int. Cl.

*G03G 9/097* (2006.01)
*G03G 9/08* (2006.01)
*G03G 9/113* (2006.01)

(52) U.S. Cl.

CPC ....... *G03G 9/09716* (2013.01); *G03G 9/0808* (2013.01); *G03G 9/0819* (2013.01); *G03G 9/09725* (2013.01); *G03G 9/1133* (2013.01)

(58) Field of Classification Search

CPC ............ G03G 9/09716; G03G 9/0808; G03G 9/0819; G03G 9/09725; G03G 9/1133

See application file for complete search history.

(56) References Cited

U.S. PATENT DOCUMENTS 5,641,601 A 6/1997 Mitani et al.
5,686,054 A 11/1997 Barthel et al.
(Continued)

FOREIGN PATENT DOCUMENTS

EP 2 799 929 A1 11/2014
EP 2 853 945 A1 4/2015
(Continued)

OTHER PUBLICATIONS

English machine translation of the description of JP-2016167029-A (Year: 2016).*

(Continued)

*Primary Examiner* — Mark F. Huff
*Assistant Examiner* — Boone Alexander Evans
(74) *Attorney, Agent, or Firm* — VENABLE LLP

(57) ABSTRACT

A toner which has a toner particle and silica fine particle A on a surface of the toner particle, wherein a weight average particle diameter of the toner is 4.0 to 15.0 μm, a carbon loss ratio when the silica fine particle A is washed with hexane is 5 to 70%, and a temperature at which a differential coefficient of a nine-point moving average of integrated values integrated from 35° C. reaches 4000 or more for an intensity of an obtained ion having a mass number (M/z) of 207 is 270° C. or higher, when mass spectrometry is carried out at a sampling interval of 0.4 seconds while heating the silica fine particle A under specific conditions.

15 Claims, 2 Drawing Sheets

(56) References Cited

U.S. PATENT DOCUMENTS 5,981,131 A * 11/1999 Hirama .................... C09C 3/12 430/108.7
6,287,739 B1 * 9/2001 Kawakami .......... G03G 9/0819 430/108.7
7,001,703 B2 2/2006 Moribe
7,097,951 B2 8/2006 Moribe
7,123,862 B2 10/2006 Hasegawa
7,147,981 B2 12/2006 Fujikawa
7,267,919 B2 9/2007 Moribe
7,279,262 B2 10/2007 Fujikawa
7,368,211 B2 5/2008 Hasegawa
7,402,368 B2 7/2008 Ogawa
7,422,832 B2 9/2008 Ogawa
7,470,494 B2 12/2008 Nishiyama
7,582,401 B2 9/2009 Ogawa
7,678,523 B2 3/2010 Hiroko
7,678,524 B2 3/2010 Hasegawa
7,704,659 B2 4/2010 Ogawa
7,811,734 B2 10/2010 Ogawa
7,855,042 B2 12/2010 Kobori
7,923,190 B2 4/2011 Magome
7,935,467 B2 5/2011 Dojo
7,939,231 B2 5/2011 Ogawa
8,084,174 B2 12/2011 Hasegawa
8,124,306 B2 2/2012 Hirata
8,227,162 B2 7/2012 Sano
8,426,091 B2 4/2013 Magome
8,426,094 B2 4/2013 Magome
8,501,377 B2 8/2013 Takahashi
8,512,925 B2 8/2013 Moribe
8,518,620 B2 8/2013 Dojo
8,614,044 B2 12/2013 Matsui
8,778,585 B2 7/2014 Matsui
8,841,054 B2 9/2014 Dojo
9,046,800 B2 6/2015 Hotta
9,097,998 B2 8/2015 Yamazaki
9,128,400 B2 9/2015 Takahashi
9,152,065 B2 10/2015 Sano
9,152,088 B1 10/2015 Kobori
9,158,217 B2 10/2015 Takahashi
9,229,345 B2 1/2016 Ikeda
9,235,151 B2 1/2016 Tanaka
9,348,253 B2 5/2016 Kanno
9,372,420 B2 6/2016 Mizo
9,377,708 B2 6/2016 Magome
9,417,540 B2 8/2016 Hashimoto
9,423,708 B2 8/2016 Tominaga et al.
9,436,112 B2 9/2016 Iwasaki
9,454,094 B2 9/2016 Tsujimoto
9,551,947 B2 1/2017 Hiroko
9,606,466 B2 3/2017 Takahashi
9,651,883 B2 5/2017 Hama
9,665,021 B2 5/2017 Ohtsu
9,665,023 B2 5/2017 Kamae
9,665,026 B2 5/2017 Iwasaki
9,671,707 B2 6/2017 Minagawa
9,703,216 B2 7/2017 Tsuchida
9,785,068 B2 10/2017 Umeda
9,804,514 B2 10/2017 Suzumura
9,804,519 B2 10/2017 Suzumura
9,829,816 B2 11/2017 Tanaka
9,841,692 B2 12/2017 Hasegawa
9,880,478 B2 1/2018 Shimano
9,897,934 B2 2/2018 Tamura
9,915,885 B2 3/2018 Katsumata
9,927,728 B2 3/2018 Arimura
9,946,179 B2 4/2018 Arimura
9,946,181 B2 4/2018 Hasegawa
9,964,874 B2 5/2018 Suzumura
9,964,881 B2 5/2018 Ikejiri
9,969,834 B2 5/2018 Ohtsu
9,971,262 B2 5/2018 Hasegawa
9,971,264 B2 5/2018 Sano
10,012,918 B2 7/2018 Ishigami
10,012,920 B2 7/2018 Shibata
10,012,921 B2 7/2018 Kamae
10,012,923 B2 7/2018 Sano
10,036,970 B2 7/2018 Kanno
10,078,281 B2 9/2018 Ida
10,082,743 B2 9/2018 Hama
10,088,765 B2 10/2018 Miyakai
10,114,303 B2 10/2018 Katsura
10,133,201 B2 11/2018 Kamae
10,146,146 B2 12/2018 Komatsu
10,151,990 B2 12/2018 Suzuki
10,175,595 B2 1/2019 Onozaki
10,197,936 B2 2/2019 Onozaki
10,203,619 B2 2/2019 Yamashita
10,216,108 B2 2/2019 Iwasaki
10,228,627 B2 3/2019 Nagashima
10,228,629 B2 3/2019 Tamura
10,234,777 B2 3/2019 Ohtsu
10,295,920 B2 5/2019 Nishikawa
10,303,075 B2 5/2019 Tanaka
10,310,397 B2 6/2019 Sano
10,353,312 B2 7/2019 Kamae
10,401,748 B2 9/2019 Hashimoto
10,423,090 B2 9/2019 Ohtsu
10,451,985 B2 10/2019 Takahashi
10,451,986 B2 10/2019 Sano
10,451,990 B2 10/2019 Kamae
10,474,049 B2 11/2019 Onozaki
10,514,624 B2 12/2019 Tamura
10,545,420 B2 1/2020 Kinumatsu
10,551,759 B2 2/2020 Watanabe
10,564,560 B2 2/2020 Onozaki et al.
10,642,178 B2 5/2020 Yamashita
10,698,327 B2 6/2020 Nagashima
10,747,132 B2 8/2020 Takahashi
10,768,543 B2 9/2020 Tsujimoto
10,775,710 B1 9/2020 Kamae
10,782,623 B2 9/2020 Yoshiba et al.
10,838,317 B2 11/2020 Sugahara
10,859,935 B2 12/2020 Ohtsu
10,859,936 B2 12/2020 Sugahara
10,877,386 B2 12/2020 Murayama
10,877,391 B2 12/2020 Matsuo
10,935,902 B2 3/2021 Kanno
10,955,765 B2 3/2021 Onozaki
10,969,704 B2 4/2021 Kagawa
11,079,695 B2 8/2021 Sato
11,099,493 B2 8/2021 Komiya
11,112,709 B2 9/2021 Saeki
11,112,713 B2 9/2021 Akiyama
11,131,938 B2 9/2021 Murayama
11,181,844 B2 11/2021 Nagaoka
11,249,410 B2 2/2022 Takahashi
11,415,902 B2 8/2022 Watanabe
11,429,032 B2 8/2022 Shibata
11,448,980 B2 9/2022 Matsui
11,531,284 B2 12/2022 Iguchi et al.
11,698,594 B2 7/2023 Takahashi
2003/0031946 A1 2/2003 Sugiura et al.
2006/0067867 A1 3/2006 Ishibashi et al.
2010/0273103 A1 * 10/2010 Baba .................... G03G 9/0827 430/110.4
2011/0311910 A1 12/2011 Matsui et al.
2012/0107741 A1 5/2012 Hiraoka et al.
2013/0296578 A1 * 11/2013 Amano ............. G03G 9/09725 549/214
2014/0377696 A1 12/2014 Hasegawa et al.
2015/0185644 A1 7/2015 Matsui
2015/0378274 A1 12/2015 Abe et al.
2018/0074421 A1 3/2018 Uchino
2018/0246430 A1 8/2018 Tanaka et al.
2019/0113858 A1 4/2019 Kamae et al.
2019/0137902 A1 5/2019 Shibata
2021/0055668 A1 2/2021 Tamura
2021/0255557 A1 8/2021 Watanabe
2021/0286282 A1 9/2021 Kobori
2021/0302853 A1 9/2021 Murata
2021/0302854 A1 9/2021 Kitamura
2021/0302855 A1 9/2021 Torii
2021/0302856 A1 9/2021 Nagashima

(56) References Cited

U.S. PATENT DOCUMENTS

| | | | |
|---|---|---|---|
| 2021/0397106 | A1 | 12/2021 | Kobori |
| 2022/0026822 | A1 | 1/2022 | Sato |
| 2022/0026823 | A1 | 1/2022 | Sano |
| 2022/0050398 | A1 | 2/2022 | Ooyama |
| 2022/0128916 | A1 | 4/2022 | Yoshida |
| 2022/0171302 | A1 | 6/2022 | Sato |
| 2022/0171303 | A1 | 6/2022 | Hiramatsu |
| 2022/0252995 | A1 | 8/2022 | Tsujimoto |
| 2022/0326633 | A1 | 10/2022 | Aoki |
| 2022/0373906 | A1 | 11/2022 | Ohmori |
| 2022/0373911 | A1 | 11/2022 | Kamae |
| 2022/0373919 | A1 | 11/2022 | Imura |
| 2023/0014130 | A1 | 1/2023 | Sano |
| 2023/0122974 | A1 | 4/2023 | Kagawa |
| 2023/0152725 | A1 | 5/2023 | Ochi |
| 2023/0408946 | A1 | 12/2023 | Sato et al. |

FOREIGN PATENT DOCUMENTS

| | | | | |
|---|---|---|---|---|
| JP | 7-330324 | A | | 12/1995 |
| JP | 9-204065 | A | | 8/1997 |
| JP | 11-174727 | A | | 7/1999 |
| JP | 2000-147831 | A | | 5/2000 |
| JP | 2002-23413 | A | | 1/2002 |
| JP | 2002-139862 | A | | 5/2002 |
| JP | 2002-182423 | A | | 6/2002 |
| JP | 2002-256173 | A | | 9/2002 |
| JP | 2004-126249 | A | | 4/2004 |
| JP | 2004-126251 | A | | 4/2004 |
| JP | 2007-114630 | A | | 5/2007 |
| JP | 2007-176747 | A | | 7/2007 |
| JP | 2008-145490 | A | | 6/2008 |
| JP | 2009-31426 | A | | 2/2009 |
| JP | 2009-271394 | A | | 11/2009 |
| JP | 2009-276643 | A | | 11/2009 |
| JP | 2012-236752 | A | | 12/2012 |
| JP | 2015-11070 | A | | 1/2015 |
| JP | 2016-66049 | A | | 4/2016 |
| JP | 2016167029 | A | * | 9/2016 |
| JP | 2019-3082 | A | | 1/2019 |
| JP | 2019-86705 | A | | 6/2019 |
| JP | 2019-109416 | A | | 7/2019 |
| JP | 2020-91471 | A | | 6/2020 |
| JP | 2020-95081 | A | | 6/2020 |
| JP | 2020-154294 | A | | 9/2020 |
| JP | 2021-148999 | A | | 9/2021 |
| WO | 2004060803 | A1 | | 7/2004 |

OTHER PUBLICATIONS

U.S. Appl. No. 18/173,255, Takayuki Toyoda, filed Feb. 23, 2023.
U.S. Appl. No. 18/307,825, Hiroki Kagawa, filed Apr. 27, 2023.
U.S. Appl. No. 18/307,826, Ryuichiro Matsuo, filed Apr. 27, 2023.
U.S. Appl. No. 18/307,827, Shin Kitamura, filed Apr. 27, 2023.
U.S. Appl. No. 18/307,829, Kazuyuki Sato, filed Apr. 27, 2023.
U.S. Appl. No. 18/307,832, Shohei Shibahara, filed Apr. 27, 2023.
ECHA Reach Registration Dossier, https://echa.europa.eu/registration-dossier/-/registered-dossier/15289/4/13.

* cited by examiner

TONER AND TWO-COMPONENT DEVELOPER

BACKGROUND OF THE INVENTION

Field of the Invention

The present disclosure relates to a toner and a two-component developer, which are used for developing electrostatic images in electrophotographic methods, electrostatic recording methods, and the like.

Description of the Related Art

Electrophotographic system-based full-color copiers have in recent years become widespread and are beginning to be applied to the print market. The print market requires that a wide range of media (paper types) be accommodated while also requiring high speeds, high image qualities, and high productivities achieved through extended continuous operation.

Stabilization of the toner charging characteristics is necessary in order to boost image quality. Various investigations of external additives have been carried out in pursuit of stabilization of toner charging characteristics. For example, Japanese Patent Application Laid-Open No. 2016-167029 discloses a toner having improved charging characteristics as achieved by the external addition of silica particles that have been surface-treated with cyclic siloxane. Japanese Patent Application Laid-Open No. 2009-031426 discloses a toner having cyclic siloxane at the surface.

In order to achieve additional enhancements in image quality, a toner which provides a high transfer efficiency, without image chipping and without transfer voids during transfer is required. For example, Japanese Patent Application Laid-Open No. H9-204065 discloses a toner that exhibits a high transfer efficiency, which is achieved by the external addition of an inorganic fine powder that has been subjected to a surface treatment with silicone oil.

In order to achieve high productivities via extended continuous operation, the investigations for suppressing member contamination through the use of external additives have also been carried out. For example, Japanese Patent Application Laid-Open No. 2004-126251 discloses a toner with the external addition of a silica particle which has been surface treated with a silane coupling agents followed by a surface treatment with a silicone oil.

SUMMARY OF THE INVENTION

However, when aiming at applications for the printing market, it is necessary to achieve even higher levels of productivity through higher speeds, higher image quality and continuous operation for longer periods. Therefore, toners need to have higher charge maintaining properties than in the past.

However, non-contact type corona charging devices are used as charging devices in photoreceptors in high speed copiers such as those used in the printing market. Because corona charging devices do not come into contact with photoreceptors, they do not come into contact with toners, silica fine particles, and the like on the photoreceptors, which is advantageous in terms of suppressing member contamination. However, when aiming for even higher levels of productivity through higher speeds, higher image quality and continuous operation for longer periods, greater discharge occurs over a long period of time in a charging step.

As a result, if an inorganic fine powder such as silica fine particles is present on a photoreceptor, the inorganic fine powder is subjected to a higher discharge energy than in the past. Here, if the surface of an inorganic fine powder is treated with a silicone oil in order to suppress transfer voids and achieve high transfer efficiency, the silicone oil subjected to a high discharge energy volatilizes and separates from the surface of the inorganic fine powder, and then adheres to a component such as a charging device, and causes contamination. As a result, charging unevenness may occur on the photoreceptor, and in-plane uniformity of an image may decrease.

In the toners disclosed in the documents mentioned above, in a case where higher image quality or higher speed was sought, it was not possible to achieve charge maintaining properties of a toner over a long period of time while suppressing charging unevenness caused by transfer voids or member contamination.

The present disclosure provides a toner which can achieve high charge maintaining properties over a long period of time while suppressing charging unevenness caused by transfer voids or member contamination even in a case where higher image quality or higher speed is sought.

The present disclosure relates to a toner which has a toner particle and silica fine particle A on a surface of the toner particle, wherein a weight average particle diameter of the toner is 4.0 to 15.0 μm, a carbon loss ratio when the silica fine particle A is washed with hexane is 5 to 70%, and a temperature at which a differential coefficient of a nine-point moving average of integrated values integrated from 35° C. reaches 4000 or more for an intensity of an obtained ion having a mass number (M/z) of 207 is 270° C. or higher, when mass spectrometry is carried out at a sampling interval of 0.4 seconds while heating the silica fine particle A under conditions described below.

Mass spectrometry conditions:

(i) 7.0 mg of the silica fine particle A is heated from 35° C. at a temperature increase rate of 20° C./min in a nitrogen atmosphere.

(ii) Gas generated as a temperature increased is ionized under a condition of an ionization current of 50 μA and an ionization energy of 70 eV.

(iii) Components contained in the ionized gas are subjected to mass spectrometry at an EM voltage of 1000 V using a quadrupole mass spectrometer.

The present disclosure is capable of providing a toner which can achieve high charge maintaining properties over a long period of time while suppressing charging unevenness caused by transfer voids or member contamination even in a case where higher image quality or higher speed is sought.

Further features of the present invention will become apparent from the following description of exemplary embodiments with reference to the attached drawings.

DESCRIPTION OF THE EMBODIMENTS

Figure 1:
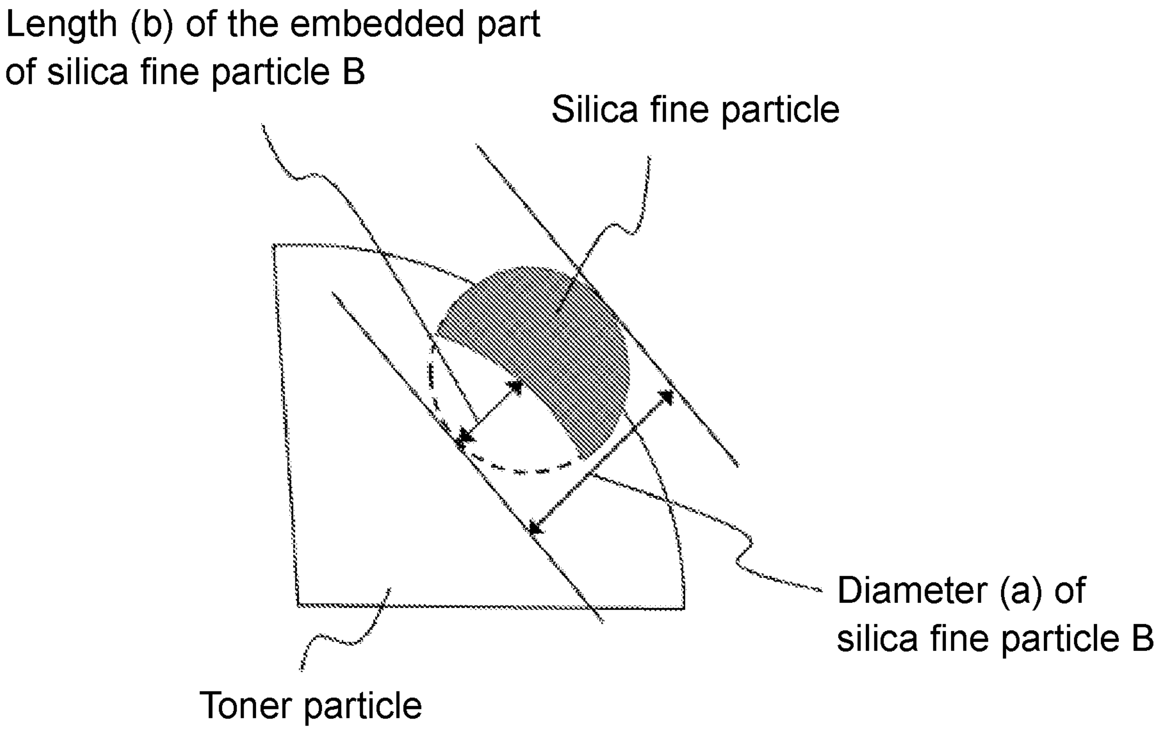
FIG. 1 is a schematic view of a calculation of degree of embedding.

Unless specifically indicated otherwise, in the present disclosure the expressions "from XX to YY" and "XX to YY" that show numerical value ranges refer to numerical value ranges that include the lower limit and upper limit that are the end points. When numerical value ranges are provided in stages, the upper limits and lower limits of the individual numerical value ranges may be combined in any combination. In addition, monomer unit refers to the state of the reacted monomer substance in the polymer.

The inventors of the present invention carried out diligent research in order to obtain a toner which can achieve high charge maintaining properties over a long period of time while suppressing charging unevenness caused by transfer voids or member contamination even in a case where higher image quality or higher speed is sought. As a result, the inventors found that the problems mentioned above can be solved by the toner described below.

The present disclosure relates to a toner which has a toner particle and silica fine particle A on a surface of the toner particle, wherein a weight average particle diameter of the toner is 4.0 to 15.0 μm, a carbon loss ratio when the silica fine particle A is washed with hexane is 5 to 70%, and a temperature at which a differential coefficient of a nine-point moving average of integrated values integrated from 35° C. reaches 4000 or more for an intensity of an obtained ion having a mass number (M/z) of 207 is 270° C. or higher, when mass spectrometry is carried out at a sampling interval of 0.4 seconds while heating the silica fine particle A under conditions described below.

Mass spectrometry conditions:

(i) 7.0 mg of the silica fine particle A is heated from 35° C. at a temperature increase rate of 20° C./min in a nitrogen atmosphere.

(ii) Gas generated as a temperature increased is ionized under a condition of an ionization current of 50 μA and an ionization energy of 70 eV.

(iii) Components contained in the ionized gas are subjected to mass spectrometry at an EM voltage of 1000 V using a quadrupole mass spectrometer.

It is thought that the reason why this advantageous effect can be achieved is as follows.

An ion having a mass number (M/z) of 207 is characteristically observed when a compound having a siloxane structure, such as a silicone oil, is decomposed by heat and ionized. In the method mentioned above, when the intensity of an ion having a mass number (M/z) of 207 is analyzed while increasing the temperature, if the differential coefficient (graph slope) of a nine-point moving average of integrated values integrated from 35° C. reaches 4000 or more, it indicates that the compound having a siloxane structure separates from the surface of the silica fine particle A due to thermal energy at the temperature, decomposes and is ionized.

That is, if this differential coefficient (graph slope) reaches 4000 or more, it indicates that the compound having a siloxane structure, such as a silicone oil, is present at the surface of the silica fine particle A. In addition, the temperature at this point must be 270° C. or higher in the toner of the present disclosure.

The ease of separation of the compounds having a siloxane structure, such as a silicone oil, from the surface of the silica fine particle A is thought to be proportional to the strength of interactions between the compound having a siloxane structure and the surface of the silica fine particle A.

It is thought that as the temperature increases, interactions between the compound having a siloxane structure, such as a silicone oil, and the surface of the silica fine particle A become stronger, and the compound having a siloxane structure is held more strongly to the surface of the silica fine particle A. As a result, in a case where higher image quality or higher speed is sought, even if a higher discharge energy is received in a charging step, the compound having a siloxane structure that is present at the surface of the silica fine particle A does not separate as a result of the discharge energy and can remain at the surface of the silica fine particle A.

Therefore, in the present disclosure, it is possible to suppress member contamination by a compound having a siloxane structure, such as a silicone oil, which could not be suppressed with conventional silica fine particles. The temperature at which the differential coefficient (graph slope) of a nine-point moving average of integrated values integrated from 35° C. reaches 4000 or more for the intensity of an ion having a mass number (M/z) of 207 is more preferably 300° C. or higher, and further preferably 320° C. or higher.

In addition, the upper limit for above temperature is preferably 500° C. or lower, more preferably 400° C. or lower, and further preferably 360° C. or lower. If the upper limit is 500° C. or lower, the compound having a siloxane structure, such as a silicone oil, is held to the surface of the silica fine particles with appropriate strength, and release properties of the toner are improved. As a result, even in a case where higher image quality or higher speed is sought, transfer voids can be better suppressed.

In addition, if the surface of the silica fine particle A is unlikely to change even if subjected to a higher energy, as described above, it means that even in a case where higher image quality or higher speed is sought, the state of charge at the toner surface is kept constant and the state of charge is stable over a long period of time. As a result, charge maintaining properties are improved.

The temperature at which the differential coefficient (graph slope) reaches 4000 can be controlled by controlling the type and quantity of a siloxane bond-containing surface treatment agent described later, the temperature and treatment time when a surface treatment is carried out, the viscosity and quantity of a silicone oil, or the temperature and treatment time when carrying out a surface treatment with a silicone oil.

Specifically, the temperature at which the differential coefficient (graph slope) reaches 4000 can be increased by using a surface treatment agent that contains a siloxane bond having an appropriate chain length and setting the temperature during a surface treatment to be 300° C. or higher, and preferably 330° C. or higher. In addition, the temperature at which the differential coefficient (graph slope) reaches 4000 can be increased by setting the temperature when carrying out a surface treatment with a silicone oil to be 220° C. or higher, preferably 300° C. or higher, and more preferably 330° C. or higher.

In addition, the carbon loss ratio when the silica fine particle A is washed with hexane is 5 to 70%. If the amount of carbon decreases when the silica fine particles are washed with hexane, it indicates that the compound having a siloxane structure mentioned above, such as a silicone oil, is present in a state whereby the compound is in a releasable state from the surface of the silica fine particle A by hexane. That is, regardless of whether the compound having a siloxane structure is present in a releasable state at the surface of the silica fine particle A, interactions between the compound having a siloxane structure and the surface of the silica fine particle A are strong. Thus, it is thought that the compound having a siloxane structure is held strongly to the surface of the silica fine particle A.

By controlling the carbon loss ratio to 5 to 70% when the silica fine particles are washed with hexane, the compound having a siloxane structure, such as a silicone oil, can be attached to the surface of the silica fine particle A with appropriate strength, and release properties of the toner are improved. As a result, transfer voids can be suppressed even in a case where higher image quality or higher speed is sought.

By setting the carbon loss ratio within the range mentioned above, the compound having a siloxane structure, such as a silicone oil, is more appropriately held to the surface of the silica. If the carbon loss ratio is 70% or less, even if a high discharge energy is applied in a charging step, the compound having a siloxane structure, such as a silicone oil, that is present at the surface of the silica fine particles is less likely to separate as a result of the discharge energy. Therefore, the compound having a siloxane structure, such as a silicone oil, is more likely to remain at the surface of the silica fine particle A, and member contamination can be suppressed.

In addition, if the carbon loss ratio is 5% or more, transfer voids can be suppressed because the compound having a siloxane structure, such as a silicone oil, is attached to the surface of the silica fine particle A with appropriate strength. In addition, the state of charge at the toner surface is kept more constant and more stable, and charge maintaining properties are improved.

The carbon loss ratio when the silica fine particle A is washed with hexane is more preferably 30 to 55%.

This carbon loss ratio can be controlled by controlling a two-stage surface treatment using a siloxane bond-containing surface treatment agent and a silicone oil, the temperature and treatment time when carrying out a surface treatment, the amount of treatment using a silicone oil, and so on. This carbon loss ratio can be increased by decreasing the temperature when carrying out a treatment with a silicone oil, increasing the amount of treatment using a silicone oil, and so on. Meanwhile, above carbon loss ratio can be decreased by increasing the temperature when carrying out a treatment with a silicone oil, decreasing the amount of treatment using a silicone oil, and so on.

If it is necessary to separate the silica fine particle A from the toner particle when measuring physical properties relating to the silica fine particle A, measurements can be carried out after separating the silica fine particles using a method described later. In the separation method described later, because separation is carried out in an aqueous medium, a hydrophobic treatment agent (for example, a silicon compound) is not eluted into the medium, and it is possible to separate the silica fine particle A from the toner particle while maintaining physical properties from before the separation step. Therefore, physical property values measured using silica fine particle A separated from the toner particle are substantially the same as physical property values measured using the silica fine particle A prior to external addition.

The weight average particle diameter (D4) of the toner is 4.0 to 15.0 fun. By setting the toner particle diameter within the range mentioned above, the silica fine particle A having the characteristics mentioned above can appropriately coat the toner surface, and the advantageous effect of the silica fine particle A can be exhibited. As a result, it is possible to obtain a toner which can achieve high charge maintaining properties over a long period of time while suppressing charging unevenness caused by transfer voids or member contamination even in a case where higher image quality or higher speed is sought.

The weight average particle diameter (D4) of the toner is preferably 5.0 to 10.0 fun, and more preferably 6.0 to 8.0 fun.

Method for Analyzing Intensity of Ion having Mass Number (M/z) of 207

The intensity of an ion having a mass number (M/z) of 207 is analyzed using a thermogravimetric mass spectrometer (TG-MS) (a JMS-Q1500GC+STA2500 Regulus quadrupole mass spectrometer produced by JEOL Ltd.). Measurement conditions are as follows.

Measurement Conditions

Amount of silica fine particle A: 7.0 mg
Measurement start temperature: 35° C.
Rate of temperature increase: 20° C./min
TG-MS measurement atmosphere: nitrogen
Ion source temperature: 250° C.
Ionization current: 50 μA
Ionization energy: 70 eV
EM voltage: 1000 V
Data sampling interval: 0.4 seconds In addition, the intensity of an ion having a mass number (M/z) of 207, which is obtained using the measurements described above, is analyzed using the method described below, and the temperature at which the differential coefficient (graph slope) of a nine-point moving average of integrated values integrated from 35° C. reaches 4000 or more is obtained.

Analysis Conditions

An average value is calculated for the intensity of an ion having a mass number (M/z) of 207 within the temperature range 35 to 100° C., and this is used as a background value.

The temperature at which the differential coefficient (graph slope) of a nine-point moving average of integrated values of ion strength reaches 4000 or more is determined by subtracting this background value from ion intensities at temperatures beyond 35° C.

Separation of Silica Fine Particles a from Toner

Physical property measurements can be carried out using the silica fine particle A that are separated from the toner using the procedure described below.

20 g of a 10 mass % aqueous solution of "Contaminon N" (neutral pH 7 detergent for cleaning precision measurement instrumentation, comprising a nonionic surfactant, anionic surfactant, and organic builder) is weighed into a vial with a 50 mL capacity and mixing with 1 g of the toner is carried out.

This is set in a "KM Shaker" (model: V.SX, Iwaki Sangyo Co., Ltd.) and shaking is carried out for 30 seconds with the speed set to 50. This results in the transfer of the silica fine particle A from the toner particle surface to the aqueous solution side.

Next, in the case of a magnetic toner containing a magnetic body, silica fine particles are obtained by separating silica fine particles that have migrated to a supernatant liquid in a state whereby toner particles are bound using a neodymium magnet, and then evaporating to dryness by carrying out vacuum drying (40° C./24 hours).

In the case of a nonmagnetic toner, a centrifugal separator (H-9R, Kokusan Co., Ltd.) (5 minutes at 1,000 rpm) is used to separate the toner particles from the silica fine particles transferred into the supernatant.

When an external additive besides the silica fine particle A has been externally added to the toner, the silica fine particle A can be separated from the other external additive by carrying out a centrifugal separation process on the external additives that have been separated from the toner using the method described above. Even when a plurality of silica fine particle species have been externally added to the toner, they can be separated using a centrifugal separation process as long as they have different particle diameter ranges. For example, separation can be performed using conditions of 40,000 rpm for 20 minutes using a CS120FNX from Hitachi Koki Co., Ltd.

Measurement of the Carbon Loss Ratio When the Silica Fine Particle A Is Washed with Hexane 1.0 g of the silica fine particle is weighed into a 50-mL screw-cap vial and 20 mL of normal-hexane is added. This is followed by extraction for 10 minutes using an ultrasound homogenizer (VP-050 from the TAITEC Corporation) at an intensity of 20 (10 W output). The resulting extract is separated using a centrifugal separator, the supernatant is removed, and the resulting moist sample is subjected to evaporative removal of the normal-hexane using an evaporator to obtain a post-hexane-wash silica fine particle.

Using a total nitrogen/total carbon analyzer (Sumigraph NC-22F, Sumika Chemical Analysis Service, Ltd.), the amount of carbon in the silica fine particle is measured both before and after the hexane wash, and the carbon loss ratio (%) is then calculated using the following formula.

the carbon loss ratio (%)={(amount (mass %) of carbon in the silica particle before the hexane wash)−(amount (mass %) of carbon in the silica particle after the hexane wash)}/(amount (mass %) of carbon in the silica particle before the hexane wash)×100

Method for Measuring Weight-Average Particle Diameter (D4) of Toner

The weight-average particle diameter (D4) of the toner is calculated by using a precision particle diameter distribution measuring device "Coulter Counter Multisizer 3" (registered trademark, manufactured by Beckman Coulter, Inc.), which is based on a pore electrical resistance method and equipped with a 100 μm aperture tube, and dedicated software "Beckman Coulter Multisizer 3 Version 3.51" (manufactured by Beckman Coulter, Inc.) provided therewith for setting measurement conditions and analyzing the measurement data, performing measurements at the number of effective measurement channels of 25,000 and analyzing the measurement data.

For the electrolytic aqueous solution used for measurement, a solution in which special grade sodium chloride is dissolved in ion-exchanged water so that the concentration is about 1% by mass, for example, "ISOTON II" (manufactured by Beckman Coulter, Inc.) can be used.

Before performing the measurement and analysis, the dedicated software is set as follows.

At the "Change Standard Measurement Method (SOM) Screen" of the dedicated software, the total number of counts in control mode is set to 50,000 particles, the number of measurements is set to 1, and a value obtained using "Standard Particle 10.0 μm" (manufactured by Beckman Coulter Co., Ltd.) is set as the Kd value. The threshold and noise level are automatically set by pressing the threshold/noise level measurement button. Also, the current is set to 1600 μA, the gain is set to 2, the electrolytic solution is set to ISOTON II, and the flash of aperture tube after measurement is checked.

At the "Pulse to Particle Diameter Conversion Setting Screen" of the dedicated software, the bin interval is set to logarithmic particle diameter, the particle diameter bin is set to a 256 particle diameter bin, and the particle diameter range is set to from 2 μm to 60 μm.

The specific measurement method is as follows.

(1) About 200 ml of the electrolytic aqueous solution is placed in a 250 ml round-bottom glass beaker exclusively provided for Multisizer 3, the beaker is set on a sample stand, and a stirrer rod is stirred counterclockwise at 24 revolutions/second. Then, the dirt and air bubbles inside the aperture tube are removed using the "Flush Aperture Tube" function of the dedicated software.

(2) About 30 ml of the electrolytic aqueous solution is placed in a 100 ml flat-bottomed glass beaker, and about 0.3 ml of a diluent obtained by 3-fold by mass dilution of "CONTAMINON N" (a 10% by mass aqueous solution of a neutral detergent for washing precision measuring instruments at pH 7, which consists of a nonionic surfactant, an anionic surfactant, and an organic builder, manufactured by Wako Pure Chemical Industries, Ltd.) as a dispersing agent with ion-exchanged water is added thereto.

(3) A predetermined amount of ion-exchanged water is placed in a water tank of an ultrasonic disperser "Ultrasonic Dispersion System Tetora 150" (manufactured by Nikkaki Bios Co., Ltd.) having an electrical output of 120 W and containing two oscillators with an oscillation frequency of 50 kHz that are built in with a phase shift of 180 degrees, and about 2 ml of the CONTAMINON N is added to the water tank.

(4) The beaker of (2) is set in the beaker fixing hole of the ultrasonic disperser and the ultrasonic disperser is operated. The height position of the beaker is adjusted so that the resonance state of the liquid level of the electrolytic aqueous solution in the beaker is maximized.

(5) While the electrolytic aqueous solution in the beaker in (4) above is being irradiated with ultrasonic waves, about 10 mg of toner is added little by little to the electrolytic aqueous solution and dispersed. Then, the ultrasonic dispersion treatment is continued for another 60 sec. In the ultrasonic dispersion, the temperature of water in the water tank is appropriately adjusted to from 10° C. to 40° C.

(6) The electrolytic aqueous solution of (5) in which the toner is dispersed is dropped using a pipette into the round-bottomed beaker of (1) installed in the sample stand, and the measured concentration is adjusted to about 5%. The measurement is continued until the number of measured particles reaches 50,000.

(7) The measurement data are analyzed with the dedicated software provided with the device, and the weight-average particle diameter (D4) is calculated. The weight-average particle diameter (D4) is the "average diameter" on the analysis/volume statistics (arithmetic mean) screen when graph/vol % is set using the dedicated software.

For the reasons given above, it is possible to obtain a toner which can achieve high charge maintaining properties over a long period of time while suppressing charging unevenness caused by transfer voids or member contamination even in a case where higher image quality or higher speed is sought.

In addition, the amount of moisture adsorption per 1 $m^2$ of a BET specific surface area of the silica fine particle A at a temperature of 30° C. and a relative humidity of 80% is preferably 0.01 to 0.07 cm $3/m^2$, more preferably 0.01 to 0.05 cm $3/m^2$, and further preferably 0.02 to 0.03 cm $3/m^2$.

The amount of moisture adsorption of the silica fine particle A is affected by the state of the surface of the silica fine particle A. If the amount of moisture adsorption of the silica fine particle A is within the range mentioned above, it indicates that the surface of the silica fine particle A exhibits suitable hydrophobicity. This means that siloxane chains bond to silanol groups that were present at the surface of the silica fine particle substrate, and that the amount of silanol groups remaining at the surface of the silica fine particle substrate therefore decreases. Therefore, it is also possible to suppress a decrease in charging in a high humidity atmosphere while suppressing excess charging in a low humidity environment as a result of a suitable amount of moisture being adsorbed.

As a result, the state of charge at the toner surface is kept more constant and more stable, and charge maintaining properties are further improved.

The amount of moisture adsorption of the silica fine particle A can be controlled by controlling the type and quantity of a siloxane bond-containing surface treatment agent described later, the temperature and treatment time when a surface treatment is carried out, and so on. More specifically, the amount of moisture adsorption can be reduced by increasing the amount of siloxane bond-containing surface treatment agent, increasing the temperature when a surface treatment is carried out, or increasing the treatment time.

Method for Measuring the Amount of Moisture Adsorption

The amount of moisture adsorption by the silica fine particle A is measured using an adsorption equilibration analyzer (BELSORP-aqua3, BEL JAPAN, Inc.). This instrument measures the amount of adsorption of a target gas (water vapor).

Degassing

The moisture adsorbed to the sample is degassed prior to the measurement. The cell, filler rod, and cap are assembled and weighed empty. 0.3 g of sample is weighed and introduced into the cell. The filler rod is inserted into the cell, the cap is attached, and attachment to the degassing port is carried out. The helium valve is opened once all the cells to be measured are attached to the degassing port. The button for a port to be degassed is set to ON and the "VAC" button is pressed. Degassing is performed for at least one day.

Measurement

The power to the main unit (there is a switch on the back side of the main unit) is turned ON. The vacuum pump is also started at the same time. The power to the water circulation unit and the operating panel is turned ON. "BELaqua3.exe" (measurement software) in the center of the PC screen is booted. Temperature control of the hot air bath: "SV" in the "TIC1" frame on the "Flow Diagram" window is double-clicked to open the "Temperature Setting" window. The temperature (80° C.) is entered and Set is clicked.

Adsorption temperature control: "SV" in "Adsorption Temperature" in the "Flow Diagram" window is double-clicked and the "SV value" (adsorption temperature) is entered. "Start Circulation" and "External Temperature Control" are clicked and Set is clicked.

The "PURGE" button is pressed and degassing is stopped, the port button is set to OFF, the sample is removed, cap 2 is attached, the sample is weighed, and the sample is attached to the main measurement unit. "Measurement Conditions" on the PC is clicked to open the "Measurement Conditions Setting" window. The measurement conditions are as follows.

air thermostat tank temperature: 80.0° C., adsorption temperature: 30.0° C., adsorbate name: $H_2O$, equilibration time: 500 sec, temperature hold: 60 min, saturated vapor pressure: 4.245 kPa, sample tube pumping speed: normal, chemical adsorption measurement: no, initial amount introduced: 0.20 cm 3 (STP)·$g^{-1}$, number of measurement relative pressure ranges: 4.

The number of samples to be measured is selected and the "Measurement Data File Name" and "Sample Weight" are entered. The measurement is started. Analysis Analysis is carried out by launching analysis software. The amount of moisture adsorbed is determined at a relative water vapor pressure of 80%.

The BET specific surface area of the silica fine particle A is preferably 60 to 160 $m^2/g$, and more preferably 70 to 160 $m^2/g$.

By having the BET specific surface area of the silica fine particle A be in the indicated range, the silica fine particle A can then coat the toner particle to a suitable degree and the effects possessed by the silica fine particle A can be better exhibited. As a result, even when a high discharge energy is applied in the charging step, the siloxane structure-bearing compounds present at the surface of the silica fine particle A more readily stay in place and are more resistant to discharge energy-induced detachment and member contamination can be suppressed even further.

In addition, the charge retention can be further enhanced because the state of the charge at the toner surface is kept more constant and the charging state is more stable. Moreover, the siloxane structure-bearing compounds are present suitably freed at the silica fine particle A surface and the releasability of the toner is enhanced. As a result, transfer voids during transfer can be further suppressed even when additional increments in image quality and speed are sought.

Measurement of BET Specific Surface Area of Silica Fine Particles

The BET specific surface area of the silica fine particle can be determined according to the BET method (the BET multipoint method) using a cryogenic gas adsorption procedure based on a dynamic constant pressure procedure. Using a specific surface area analyzer (product name: Gemini 2375 Ver. 5.0, Shimadzu Corporation), the BET specific surface area ($m^2/g$) can be calculated by measurement carried out using the BET multipoint method and adsorption of nitrogen gas to the sample surface.

The amount of a released component on a carbon basis for the silica fine particle A used in the present invention is preferably 3.0 to 9.0 parts by mass, more preferably 5.0 to 8.0 parts by mass, and further preferably 6.0 to 8.0 parts by mass, relative to 100 parts by mass of the silica fine particle A.

By setting the amount of a released component within the range mentioned above, a compound having a siloxane structure is moderately free at the surface of silica fine particle A, and the release properties of the toner are improved. As a result, transfer voids can be suppressed even in a case where higher image quality or higher speed is sought.

In addition, by setting the amount of a released component within the range mentioned above, the compound having a siloxane structure is more suitably held at the surface of the silica fine particle A. As a result, even if a high discharge energy is applied in a charging step, the compound having a siloxane structure that is present at the surface of the silica fine particle A is less likely to separate as a result of the discharge energy and can remain at the surface of the silica fine particles, and member contamination can be better suppressed. In addition, the charge retention can be further enhanced because the state of the charge at the toner surface is kept more constant and the charging state is more stable.

The amount of a released component can be controlled by controlling a two-stage surface treatment using a siloxane bond-containing surface treatment agent and a silicone oil, the temperature and treatment time when carrying out a surface treatment, the amount of treatment using a silicone oil, and so on.

More specifically, the amount of a released component on a carbon basis for the silica fine particle A can be increased by decreasing the temperature when carrying out a treatment with a silicone oil, increasing the amount of treatment using a silicone oil, and so on. In addition, the amount of a released component on a carbon basis for the silica fine particle A can be decreased by increasing the temperature when carrying out a treatment with a silicone oil, decreasing the amount of treatment using a silicone oil, and so on.

Method for Measuring the Amount of Released Component on a Carbon Basis for the Silica Fine Particle A The amount of the released component on a carbon basis for the silica fine particle A can be determined by measuring the amount of silicone oil that is eluted upon immersion in normal-hexane.

Specifically, 0.5 g of a silica fine particle A sample and 32 mL normal-hexane are placed in a 50-mL centrifuge tube and ultrasound dispersion/suspension is carried out for 30 minutes using an ultrasound cleaner (1510JMTH, Yamato Scientific Co., Ltd.). The resulting suspension is subjected to centrifugal separation and a solid phase (silica) is separated and recovered. Another 32 mL normal-hexane is added to the recovered silica, and the process of ultrasound dispersion and centrifugal separation is carried out a total of three times, followed by drying under reduced pressure (120° C., 12 hours) to obtain a dry powder.

The carbon content of this powder is measured using a total nitrogen/total carbon analyzer (Sumigraph NC-22F, Sumika Chemical Analysis Service, Ltd.). The total carbon content in a 0.5 g sample is also preliminarily measured, and the difference from this total carbon content is calculated to give the amount of the extracted released component.

The silica fine particle A preferably has a compound having a siloxane structure at the surface thereof. The silica fine particle A is preferably obtained by mixing a silica fine particle substrate with a siloxane bond-containing surface treatment agent, carrying out a heat treatment, and then treating with a silicone oil. In the present disclosure, "silica fine particle A" includes the surface treatment agent-derived portions when the silica fine particle A has been surface-treated with a surface treatment agent, e.g., silicone oil. A silica fine particle prior to surface treatment is also referred to as a "silica fine particle substrate".

The production method to obtain the toner preferably comprises a step to obtain a the silica fine particle A, and a step to obtain a toner by mixing the silica fine particle A with a toner particle. In addition, the production method to obtain the toner preferably comprises a step of providing the silica fine particle A obtained by the following step.

The step to obtain the silica fine particle A preferably comprises:

- a step to obtain a surface-treated material of a silica fine particle substrate with a siloxane-bond-containing surface treatment agent by mixing a silica fine particle substrate with a siloxane bond-containing surface treatment agent (preferably a cyclic siloxane) and carrying out a heat treatment at a temperature of 295° C. or higher (preferably 300° C. or higher); and
- a step to obtain the silica fine particle A by further treating the surface-treated material with a silicone oil.

The siloxane bond-containing surface treatment agent is not particularly limited and known materials may be used. Surface treatment of the silica fine particle substrate is preferably performed in order to facilitate obtaining the properties described in the preceding.

The siloxane bond-containing surface treatment agent can be exemplified by silicone oils, e.g., dimethylsilicone oil; silicone oils provided by the modification of a dimethylsilicone oil with an organic group in side chain or terminal position, e.g., methylhydrogensilicone oil, methylphenylsilicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, and fluorine-modified silicone oil; and by cyclic siloxanes, e.g., hexamethylcyclotrisiloxane, octamethylcyclotetrasiloxane, decamethylcyclopentasiloxane.

The siloxane bond-containing surface treatment agent is preferably a cyclic siloxane. Cyclic siloxanes up to 10-membered rings are more preferred. The cyclic siloxane may be a cyclic siloxane in which a portion of the silicon atom-bonded methyl groups have a substituent. The silica fine particle A is preferably a treated material provided by treating silica fine particle with a cyclic siloxane, and further treating the resultant with a silicone oil. The cyclic siloxane is preferably at least one selection from the group consisting of hexamethylcyclotrisiloxane, octamethylcyclotetrasiloxane, and decamethylcyclopentasiloxane. The cyclic siloxane more preferably comprises octamethylcyclotetrasiloxane.

The method for performing surface treatment of the silica fine particle substrate is not particularly limited, and surface treatment can be performed by bringing the siloxane bond-containing surface treatment agent into contact with the silica fine particle substrate. Viewed from the standpoint of uniformly treating the surface of the silica fine particle substrate and readily achieving the properties described in the preceding, the surface treatment agent is preferably brought into contact with the silica fine particle substrate by a dry method. Examples, as described in the following, are a method in which a vapor of the surface treatment agent is brought into contact with the silica fine particle substrate, or a method in which contact with the silica fine particle substrate is effected by spraying an undiluted solution of the surface treatment agent or by spraying a dilution thereof with any of various solvents.

The treatment temperature is not particularly limited because it also varies as a function of, e.g., the reactivity of the surface treatment agent being used. A heat treatment at a temperature of 300° C. or more with mixing of the silica fine particle substrate and surface treatment agent is preferred. From 300° C. to 380° C. is more preferred.

The treatment time also varies as a function of the reactivity of the surface treatment agent being used and the treatment temperature, but is preferably from 5 minutes to 300 minutes, more preferably from 30 minutes to 240 minutes, and still more preferably from 60 minutes to 200 minutes. Having the treatment temperature and treatment time of the surface treatment be in the indicated ranges is also preferred from the standpoint of bringing about a satisfactory reaction of the treatment agent with the silica fine particle substrate and from the standpoint of production efficiency.

In a preferred method for contacting the surface treatment agent with the silica fine particle substrate, contact is performed with a vapor of the surface treatment agent under reduced pressure or in an inert gas atmosphere, for example, a nitrogen atmosphere. By using a method comprising contacting with a vapor, any surface treatment agent that has not reacted with the surface of the silica fine particles is easily removed, and the surface of the silica fine particles can be appropriately coated with a modifying group having a suitable polarity. In a case where a method comprising contacting with a vapor of a surface treatment agent is used, it is preferable to carry out the treatment at a temperature that is not lower than the boiling point of the surface treatment agent. Contact with the vapor may be carried out by dividing the procedure into multiple times (for example, 2 to 3 times).

The silica fine particle A is obtained by treating a silica fine particle substrate with a cyclic siloxane, and the temperature when treating with the cyclic siloxane is more preferably 300° C. or higher.

Because the cyclic siloxane reacts with a silanol group at the surface of the silica fine particle substrate in a ring-opening reaction, the surface of the silica fine particle A can be appropriately coated with a modifying group having a suitable polarity. By constituting in this way, interactions between the compound having a siloxane structure and the surface of the silica fine particle A can be controlled to an appropriate strength. Therefore, it becomes easier to increase the temperature at which the differential coefficient reaches 4000 or more. In addition, the carbon loss ratio when the silica fine particles are washed with hexane tends to be controlled within a preferred range.

Meanwhile, a silanol group at a terminal of a modifying group derived from the cyclic siloxane, which is generated in the ring-opening reaction between the cyclic siloxane and a silanol group at the surface of the silica fine particle substrate, serves as a site of a reaction with the cyclic siloxane, meaning that the chain length is likely to increase. The treatment temperature is preferably 300° C. or higher because siloxane bonds are generated and broken and it is possible to uniformly control the chain length. If the chain length becomes uniform, the surface of the silica fine particle A can be more appropriately coated with a modifying group having a suitable polarity.

By coating the surface of the silica fine particle substrate with a modifying group having a suitable chain length, it is thought that when a subsequent silicone oil treatment is carried out, interactions between the silicone oil and a modifying group derived from the cyclic siloxane are stronger. Therefore, it becomes easier to increase the temperature at which the differential coefficient reaches 4000 or more. In addition, the carbon loss ratio when the silica fine particles are washed with hexane is easy to be controlled within a preferred range.

As a result, even when a high discharge energy is applied in the charging step, the silicone oil present at the surface of the silica fine particle A is more resistant to discharge energy-induced detachment and member contamination can be suppressed even further. In addition, the charge retention can be further enhanced because the state of the charge at the toner surface is kept more constant and the charging state is more stable. Moreover, the siloxane structure-bearing compounds are present suitably freed at the silica fine particle A surface and the releasability of the toner is enhanced. As a result, transfer voids during transfer can be further suppressed even when additional increments in image quality and speed are sought.

Among cyclic siloxanes, octamethylcyclotetrasiloxane is more preferred from the perspectives of being able to control the chain length of a modifying group at the surface of the silica fine particle A and facilitating purification. By using octamethylcyclotetrasiloxane, the chain length of a modifying group at the surface of the silica fine particle A can be more uniformly controlled and the surface of the silica fine particle A can be more appropriately coated with a modifying group having a suitable polarity. Therefore, it becomes easier to increase the temperature at which the differential coefficient reaches 4000 or more. In addition, the carbon loss ratio when the silica fine particles are washed with hexane tends to be controlled within a preferred range.

As a result, even if a high discharge energy is applied in a charging step, the silicone oil present at the surface of the silica fine particle A is less likely to separate as a result of the discharge energy, and contamination of components can be better suppressed. In addition, the charge retention can be further enhanced because the state of the charge at the toner surface is kept more constant and the charging state is more stable.

Moreover, the siloxane structure-bearing compounds are present suitably freed at the silica fine particle A surface and the releasability of the toner is enhanced. As a result, transfer voids during transfer can be further suppressed even when additional increments in image quality and speed are sought.

The amount of the surface treatment agent, relative to 100 parts by mass of the silica fine particle substrate, is preferably from 40 to 150 parts by mass, and is more preferably from 70 to 140 parts by mass. In particular, when the surface treatment is performed by a method in which contact with cyclic siloxane is effected using a vapor, preferably at least 100 parts by mass is added relative to 100 parts by mass of the silica fine particle substrate. By constituting in this way, the silica fine particle substrate can be more uniformly surface treated, and the surface of the silica fine particles can be more appropriately coated with a modifying group having a suitable polarity. Therefore, it becomes easier to increase the temperature at which the differential coefficient reaches 4000 or more. In addition, the carbon loss ratio when the silica fine particles are washed with hexane tends to be controlled within a preferred range.

As a result, even when a high discharge energy is applied in the charging step, the silicone oil present at the surface of the silica fine particle A is more prone to stay in place and is more resistant to discharge energy-induced detachment and member contamination can be suppressed even further. In addition, the charge retention can be further enhanced because the state of the charge at the toner surface is kept more constant and the charging state is more stable. Moreover, the siloxane structure-bearing compounds are present suitably freed at the silica fine particle A surface and the releasability of the toner is enhanced. As a result, transfer voids during transfer can be further suppressed even when additional increments in image quality and speed are sought.

When the surface treatment is carried out under reduced pressure, the pressure within the vessel due to the vapor of the surface treatment agent is preferably brought to from 0.1 Pa to 100 Pa and more preferably from 1.0 Pa to 10 Pa. By having the pressure be in the indicated range, the frequency of contact between vapor molecules of the surface treatment agent is reduced and surface treatment agent-to-surface treatment agent chemical reactions are then suppressed, and chemical reactions between the silica fine particle substrate and the surface treatment agent in contact with the silica fine particle substrate surface can proceed preferentially.

In addition, secondary reaction products produced by chemical reactions between the silica fine particle substrate and the surface treatment agent are easily removed from the vicinity of the silica fine particle surface and contact by the surface treatment agent with the silica fine particle substrate surface is more easily achieved, and the surface of the silica fine particle substrate can then be more uniformly treated.

When the surface treatment is carried out under reduced pressure, contact between the surface treatment agent and the silica fine particle substrate surface is preferably preceded by the execution of a degassing treatment in which the silica fine particle substrate is heated under reduced pressure; this removes, for example, the moisture adsorbed to the surface of the silica fine particle substrate. By doing this, contact by the surface treatment agent with the silica fine particle substrate surface is more easily achieved and the surface of the silica fine particle substrate can then be more uniformly treated. Moreover, from the standpoint of further facilitating contact between the surface treatment agent and the silica fine particle substrate surface, the degassing treatment and the surface treatment of the silica fine particle by the surface treatment agent are also preferably carried out repeatedly.

After having mixed the silica fine particle substrate with the siloxane bond-containing surface treatment agent and having carried out the heat treatment, the silica fine particle substrate is preferably additionally treated with silicone oil. The heat treatment with silicone oil, which is the second-stage reaction, is preferably carried out at a treatment temperature of 300° C. or more. That is, the temperature when the surface-treated material is further treated with silicone oil is preferably 300° C. or more.

Having the treatment temperature be 300° C. or more facilitates a uniform intermingling of the silicone oil with the silica fine particle surface that has been surface-treated with the cyclic siloxane, and the interaction between the silicone oil and the modifying groups due to the cyclic siloxane at the silica fine particle surface is then strengthened. Therefore, it becomes easier to increase the temperature at which the differential coefficient reaches 4000 or more. In addition, the carbon loss ratio when the silica fine particles are washed with hexane tends to be controlled within a preferred range.

As a result, even when a high discharge energy is applied in the charging step, the silicone oil present at the surface of the silica fine particle A is more prone to stay in place and is more resistant to discharge energy-induced detachment and member contamination can be suppressed even further. In addition, the charge retention can be further enhanced because the state of the charge at the toner surface is kept more constant and the charging state is more stable.

Moreover, the siloxane structure-bearing compounds are present suitably freed at the silica fine particle A surface and the releasability of the toner is enhanced. As a result, transfer voids during transfer can be further suppressed even when additional increments in image quality and speed are sought.

From the standpoint of uniformly treating the silica surface, the treatment time with silicone oil is preferably from 40 minutes to 150 minutes and is more preferably from 60 minutes to 120 minutes.

The amount of silicone oil addition, relative to 100 parts by mass of the silica fine particle substrate, is preferably from 3 to 25 parts by mass and is more preferably from 5 to 20 parts by mass. If this added quantity is as mentioned above, it is possible to uniformly treat the surface of the silica fine particle A and effectively achieve interactions with modifying groups derived from the cyclic siloxane at the surface of the silica fine particle A. Therefore, it becomes easier to increase the temperature at which the differential coefficient reaches 4000 or more. In addition, the carbon loss ratio when the silica fine particles are washed with hexane tends to be controlled within a preferred range.

As a result, even when a high discharge energy is applied in the charging step, the silicone oil present at the surface of the silica fine particle A is more prone to stay in place and is more resistant to discharge energy-induced detachment and member contamination can be suppressed even further. In addition, the charge retention can be further enhanced because the state of the charge at the toner surface is kept more constant and the charging state is more stable.

Moreover, the siloxane structure-bearing compounds are present suitably freed at the silica fine particle A surface and the releasability of the toner is enhanced. As a result, transfer voids during transfer can be further suppressed even when additional increments in image quality and speed are sought.

The kinematic viscosity at 25° C. of the silicone oil regulates molecular mobility derived from the silicone oil, and is preferably from 30 to 500 $mm^2/s$, more preferably from 40 to 200 $mm^2/s$, and further preferably from 70 to 130 $mm^2/s$. By controlling the kinematic viscosity at 25° C. of the silicone oil within the range mentioned above, the chain length of the silicone oil falls within a suitable range and interactions with modifying groups derived from the cyclic siloxane at the surface of the silica fine particle A can be effectively achieved. Therefore, it becomes easier to increase the temperature at which the differential coefficient reaches 4000 or more. In addition, the carbon loss ratio when the silica fine particles are washed with hexane tends to be controlled within a preferred range.

As a result, even when a high discharge energy is applied in the charging step, the silicone oil present at the surface of the silica fine particle A is more prone to stay in place and is more resistant to discharge energy-induced detachment and member contamination can be suppressed even further. In addition, the charge retention can be further enhanced because the state of the charge at the toner surface is kept more constant and the charging state is more stable.

Moreover, the siloxane structure-bearing compounds are present suitably freed at the silica fine particle A surface and the releasability of the toner is enhanced. As a result, transfer voids during transfer can be further suppressed even when additional increments in image quality and speed are sought.

Well-known materials can be used as the silica fine particle substrate that is a silica fine particle prior to the surface treatment of the silica fine particle A. Examples thereof include silicon compounds, and especially silicon halides such as silicon chlorides, fumed silica generally produced by firing purified silicon tetrachloride in an oxyhydrogen flame, wet silica produced from water glass, sol-gel type silica particles obtained using a wet method, gel type silica particles, aqueous colloidal silica particles, alcoholic silica particles, fused silica particles obtained using a gas phase method, and silica particles obtained using a deflagration method. Fumed silica is preferred.

The number average particle diameter of the silica fine particle A is preferably 5 to 40 nm, more preferably 8 to 25 nm, and further preferably 10 to 17 nm. By constituting in this way, the silica fine particle A can appropriately coat the toner particle and the advantageous effect of the silica fine particle A can be exhibited.

As a result, even if a high discharge energy is applied in a charging step, the compound having a siloxane structure that is present at the surface of the silica fine particle A tends to remain, is less likely to separate as a result of the discharge energy and can remain at the surface of the silica fine particles, and member contamination can be better suppressed. In addition, the state of charge at the toner surface is kept more constant and more stable, and charge maintaining properties are further improved.

In addition, the compound having a siloxane structure is moderately free at the surface of silica fine particle A, and the release properties of the toner are improved. As a result, even in a case where higher image quality or higher speed is sought, transfer voids can be better suppressed.

The silica fine particle A, which is obtained using a surface treatment method such as that described above, can exhibit a more preferred effect by being used in combination with silica fine particle B that is different in terms of particle diameter from the silica fine particle A. That is, the toner preferably further comprises a silica fine particle B which is different from the silica fine particle A.

By adding the silica fine particle B, the surface of the silica fine particle A can interact appropriately with the surface of the silica fine particle B. As a result, the compound having a siloxane structure, such as a silicone oil, which is present at the surface of the silica fine particle A is held between the surface of the silica fine particle A and the surface of the silica fine particle B with appropriate strength. Therefore, the compound having a siloxane structure that is present at the surface of the silica fine particle A is more likely to remain.

The number average particle diameter of the silica fine particle B is preferably to 500 nm, more preferably 70 to 300 nm, and further preferably 80 to 200 nm. If the number average particle diameter of the silica fine particle B is within the range mentioned above, dispersibility of the silica fine particle B at the toner surface is improved and the toner can be suitably coated.

In addition, the silica fine particles B preferably has the number average particle diameter at least 50 nm greater than the number average particle diameter of the silica fine particle A, more preferably at least 70 nm, and further preferably by at least 100 nm greater than the number average particle diameter of the silica fine particle A. For example, the number average particle diameter of the silica fine particle B is preferably greater than the number average particle diameter of the silica fine particle A by 50 to 200 nm, more preferably by 70 to 180 nm, and further preferably by 100 to 150 nm.

If the number average particle diameter ranges for the silica fine particle A and the silica fine particle B satisfy the relationship mentioned above, the surface of the silica fine particle A can interact appropriately with the surface of the silica fine particle B. As a result, the compound having a siloxane structure, such as a silicone oil, which is present at the surface of the silica fine particle A is held between the surface of the silica fine particle A and the surface of the silica fine particle B with appropriate strength.

Therefore, even if a high discharge energy is applied in a charging step, the compound having a siloxane structure that is present at the surface of the silica fine particle A tends to remain and is less likely to separate as a result of the discharge energy, and member contamination can be better suppressed. In addition, the state of charge at the toner surface is kept more constant and more stable, and charge maintaining properties are further improved.

In addition, the compound having a siloxane structure is moderately free at the surface of silica fine particle A, and the release properties of the toner are improved. As a result, even in a case where higher image quality or higher speed is sought, transfer voids can be better suppressed.

The Number Average Particle Diameter of the Silica Fine Particle

The measurement of the number average particle diameter of the silica fine particle can be carried out in the range setting of 0.001 μm to 10 μm using an HRA (X-100) Microtrac particle size distribution analyzer (Nikkiso Co., Ltd.).

The determination can also be made by measuring the number and particle diameter (largest diameter) of the silica fine particles present on the toner particle surface during observation of the toner particle using a scanning electron microscope (SEM), whereby a number-average particle diameter that is substantially the same is obtained. Here, an energy-dispersive x-ray analyzer (EDS) attached to the SEM can be used to confirm that the material targeted for measurement is a silica fine particle.

When a silica fine particle A+silica fine particle B combination is used, due to the co-use of silica fine particles that exhibit large differences in the particle diameter, as a general matter the average particle diameter can be calculated by establishing a prescribed particle diameter as a dividing line and partitioning into particles larger than this and particles smaller than this. For the dividing line particle diameter, the particle diameter distribution of the silica fine particles on the toner particle surface may be measured and a particle diameter whose frequency is a trough (minimum value sandwiched between maximum values) may be used.

The toner production method preferably contains a step of obtaining the silica fine particle B. In addition, the toner production method preferably has a step of providing the silica fine particle B yielded by the following step.

The step of obtaining the silica fine particle B preferably has a step of obtaining a silica fine particle B by mixing a silica fine particle substrate with a siloxane bond-containing surface treatment agent and carrying out a heat treatment at a temperature of 295° C. or more (preferably 300° C. or more) to carry out surface treatment of the surface of the silica fine particle substrate with the siloxane bond-containing surface treatment agent.

That is, the silica fine particle B is preferably a treated material provided by treatment with a siloxane bond-containing surface treatment agent. With regard to the scheme for the surface treatment of the silica fine particle B with the siloxane bond-containing surface treatment agent, this is the same as or similar to the scheme described above in relation to the silica fine particle A. The surface treatment of the silica fine particle B is preferably carried out with contact with the vapor of the siloxane bond-containing surface treatment agent being divided into a plurality of times (for example, 2 to 4 times). Surface treatment of the silica fine particle B is preferably carried out using cyclic siloxane.

The silica fine particle B can be exemplified by the fumed silicas produced by the combustion in an oxyhydrogen flame of a silicon compound, particularly a silicon halide, generally a silicon chloride, and commonly a purified silicon tetrachloride; wet silicas produced from water glass; sol-gel method silica particles obtained by a wet method; gel method silica particles; aqueous colloidal silica particles; alcoholic silica particles; fused silica particles obtained by a vapor phase method; and deflagration method silica particles. Fumed silicas are preferred.

The silica fine particle B is preferably, for example, spherical silica fine particle. The term "spherical" encompasses approximately spherical shapes, such as shapes that are slightly elliptical and shapes in which one part of a sphere is slightly missing. The average circularity of the silica fine particle B is preferably 0.900 to 1.000, and more preferably 0.930 to 0.990.

Measurement of Average Circularity of Silica Fine Particle B

Circularity is determined by observing the silica fine particle B with a scanning electron microscope (SEM) at a magnification of 25,000 times and a pixel count of 1280×960 pixels (the size of one pixel is approximately 4 nm×approximately 4 nm) and then analyzing the acquired image using Image J image analysis software (available from https://imagej.nih.gov/ij/).

First, silica fine particle B is subjected to contour extraction, and the projected area S and circumference L of particle are measured.

Next, the circle-equivalent diameter and circularity are determined from the area S and circumference L. The circle-equivalent diameter is defined as the diameter of a circle having the same projected area as a particle image, and the circularity is defined as the value obtained by dividing the circumference of a circle determined from the circle-equivalent diameter by the circumference of the particle image, and is calculated using the following formula.

$$\text{Circularity} = 2\times(\pi\times S)^{1/2}/L$$

This circularity is calculated for at least 100 silica fine particles B, and the arithmetic mean value thereof is taken to be the average circularity of the silica fine particle B.

The toner particle may contain a binder resin. A known binder resin can be used in the toner particle. The following are examples of the binder resin:

styrene resins, styrenic copolymer resins, polyester resins, polyol resins, polyvinyl chloride resins, phenolic resins, natural resin-modified phenolic resins, natural resin-modified maleic acid resins, acrylic resins, methacrylic resins, polyvinyl acetate, silicone resins, polyurethane resins, polyamide resins, furan resins, epoxy resins, xylene resins, polyvinyl butyral, terpene resins, coumarone-indene resins, and petroleum resins. Resins preferred for use are styrenic copolymer resins, polyester resins, and hybrid resins provided by mixing a polyester resin with a styrenic copolymer resin or partially reacting the two. The use of polyester resins is preferred.

The components constituting the polyester resin will now be described. A single species or two or more species of the various following components can be used depending on the type and use.

The dibasic carboxylic acid component constituting the polyester resin can be exemplified by the following dicarboxylic acids and their derivatives: benzenedicarboxylic acids and their anhydrides and lower alkyl esters, e.g., phthalic acid, terephthalic acid, isophthalic acid, and phthalic anhydride; alkyl dicarboxylic acids, e.g., succinic acid, adipic acid, sebacic acid, and azelaic acid, and their anhydrides and lower alkyl esters; alkenylsuccinic acids and alkylsuccinic acids having an average value for the number of carbons of from 1 to 50, and their anhydrides and lower alkyl esters; and unsaturated dicarboxylic acids, e.g., fumaric acid, maleic acid, citraconic acid, and itaconic acid, and their anhydrides and lower alkyl esters.

The alkyl group in the lower alkyl esters can be exemplified by the methyl group, ethyl group, propyl group, and isopropyl group.

The dihydric alcohol component constituting the polyester resin, on the other hand, can be exemplified by the following:

ethylene glycol, polyethylene glycol, 1,2-propanediol, 1,3-propanediol, 1,3-butanediol, 1,4-butanediol, 2,3-butanediol, diethylene glycol, triethylene glycol, 1,5-pentanediol, 1,6-hexanediol, neopentyl glycol, 2-methyl-1,3-propanediol, 2-ethyl-1,3-hexanediol, 1,4-cyclohexanedimethanol (CHDM), hydrogenated bisphenol A, bisphenols given by Formula (I-1) and derivatives thereof, and diols given by Formula (I-2).

(I-1)

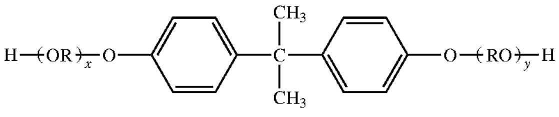

In Formula (I-1), R is the ethylene group or propylene group, x and y are each integers equal to or greater than 0, and the average value of x+y is from 0 to 10.

(I-2)

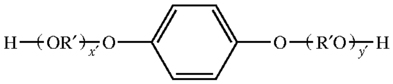

In Formula (I-2), R' is the ethylene group or propylene group, x' and y' are each integers equal to or greater than 0, and the average value of x'+y' is from 0 to 10.

In addition to the aforementioned dibasic carboxylic acid component and dihydric alcohol component, the constituent components of the polyester resin may also contain an at least tribasic carboxylic acid component and an at least trihydric alcohol component.

The at least tribasic carboxylic acid component is not particularly limited and can be exemplified by trimellitic acid, trimellitic anhydride, and pyromellitic acid. The at least trihydric alcohol component can be exemplified by trimethylolpropane, pentaerythritol, and glycerol.

In addition to the aforementioned compounds, the constituent components of the polyester resin may include a monobasic carboxylic acid component and a monohydric alcohol component as constituent components. Specifically, the monobasic carboxylic acid component can be exemplified by palmitic acid, stearic acid, arachidic acid, behenic acid, cerotic acid, heptacosanoic acid, montanic acid, melissic acid, lacceric acid, tetracontanoic acid, and pentacontanoic acid.

The monohydric alcohol component can be exemplified by behenyl alcohol, ceryl alcohol, melissyl alcohol, and tetracontanol.

The toner can be used as a magnetic one-component toner, a non-magnetic one-component toner or a non-magnetic two-component toner. When used in the form of a magnetic single-component toner, a magnetic iron oxide particle is preferably used as a colorant. The magnetic iron oxide particle contained in a magnetic single-component toner can be exemplified by magnetic iron oxides such as magnetite, maghemite, and ferrite, and by magnetic iron oxides that contain other metal oxides; as well as by metals such as Fe, Co, and Ni, alloys of these metals with metals such as Al, Co, Cu, Pb, Mg, Ni, Sn, Zn, Sb, Be, Bi, Cd, Ca, Mn, Se, Ti, W, and V, and their mixtures. The content of the magnetic iron oxide particle is preferably from 30 parts by mass to 150 parts by mass relative to 100 parts by mass of the binder resin.

The colorants listed below can be given as examples of colorants in cases where the toner is used as a non-magnetic one-component toner or a non-magnetic toner for a two-component developer.

Carbon black, e.g., furnace black, channel black, acetylene black, thermal black, and lamp black, may be used as a black pigment, as can a magnetic powder such as magnetite and ferrite.

A pigment or dye may be used as a colorant suitable for the color yellow. The pigments can be exemplified by C. I. Pigment Yellow 1, 2, 3, 4, 5, 6, 7, 10, 11, 12, 13, 14, 15, 17, 23, 62, 65, 73, 74, 81, 83, 93, 94, 95, 97, 98, 109, 110, 111, 117, 120, 127, 128, 129, 137, 138, 139, 147, 151, 154, 155, 167, 168, 173, 174, 176, 180, 181, 183, and 191, and C. I. Vat Yellow 1, 3, and 20. The dyes can be exemplified by C. I. Solvent Yellow 19, 44, 77, 79, 81, 82, 93, 98, 103, 104, 112, and 162. A single one of these may be used by itself or two or more may be used in combination.

A pigment or dye may be used as a colorant suitable for the color cyan. The pigments can be exemplified by C. I. Pigment Blue 1, 7, 15, 15:1, 15:2, 15:3, 15:4, 16, 17, 60, 62, and 66; C. I. Vat Blue 6; and C. I. Acid Blue 45. The dyes can be exemplified by C. I. Solvent Blue 25, 36, 60, 70, 93, and 95. A single one of these may be used by itself or two or more may be used in combination.

A pigment or dye may be used as a colorant suitable for the color magenta. The pigments can be exemplified by C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 48:2, 48:3, 48:4, 49, 50, 51, 52, 53, 54, 55, 57, 57:1, 58, 60, 63, 64, 68, 81, 81:1, 83, 87, 88, 89, 90, 112, 114, 122, 123, 144, 146, 150, 163, 166, 169, 177, 184, 185, 202, 206, 207, 209, 220, 221, 238, and 254; C. I. Pigment Violet 19; and C. I. Vat Red 1, 2, 10, 13, 15, 23, 29, and 35.

The magenta dyes can be exemplified by oil-soluble dyes such as C. I. Solvent Red 1, 3, 8, 23, 24, 25, 27, 30, 49, 52, 58, 63, 81, 82, 83, 84, 100, 109, 111, 121, and 122, C. I. Disperse Red 9, C. I. Solvent Violet 8, 13, 14, 21, and 27, and C. I. Disperse Violet 1, and by basic dyes such as C. I. Basic Red 1, 2, 9, 12, 13, 14, 15, 17, 18, 22, 23, 24, 27, 29, 32, 34, 35, 36, 37, 38, 39, and 40, and C. I. Basic Violet 1, 3, 7, 10, 14, 15, 21, 25, 26, 27, and 28. A single one of these may be used by itself or two or more may be used in combination.

The colorant content is preferably from 1 parts by mass to 20 parts by mass relative to 100 parts by mass of the binder resin.

A release agent (wax) may be used in order to provide the toner with releasability.

The wax can be exemplified by the following: aliphatic hydrocarbon waxes such as low molecular weight polyethylene, low molecular weight polypropylene, olefin copolymers, microcrystalline wax, paraffin wax, and Fischer-Tropsch waxes; oxidized waxes of aliphatic hydrocarbon waxes, such as oxidized polyethylene wax; waxes in which the major component is fatty acid ester, such as carnauba wax, behenyl behenate, and montanic acid ester wax; and waxes provided by the partial or complete deoxization of fatty acid esters, such as deoxidized carnauba wax.

Additional examples are as follows: saturated straight-chain fatty acids such as palmitic acid, stearic acid, and montanic acid; unsaturated fatty acids such as brassidic acid, eleostearic acid, and valinaric acid; saturated alcohols such as stearyl alcohol, aralkyl alcohols, behenyl alcohol, camaubyl alcohol, ceryl alcohol, and melissyl alcohol; polyhydric alcohols such as sorbitol; fatty acid amides such as linoleamide, oleamide, and lauramide; saturated fatty acid bisamides such as methylenebisstearamide, ethylenebiscapramide, ethylenebislauramide, and hexamethylenebisstearamide; unsaturated fatty acid amides such as ethylenebisoleamide, hexamethylenebisoleamide, N,N'-dioleyladipamide, and N,N'-dioleylsebacamide; aromatic bisamides such as m-xylenebisstearamide and N,N'-distearylisophthalamide; fatty acid metal salts (generally known as metal soaps) such as calcium stearate, calcium laurate, zinc stearate, and magnesium stearate; waxes provided by grafting an aliphatic hydrocarbon wax using a vinyl comonomer such as styrene or acrylic acid; partial esters between a fatty acid and a polyhydric alcohol, such as behenyl monoglyceride; and hydroxy group-containing methyl ester compounds obtained by, e.g., the hydrogenation of plant oils.

Aliphatic hydrocarbon waxes are waxes particularly preferred for use. Preferred examples are low molecular weight hydrocarbons provided by the high-pressure radical polymerization of alkylene or by the low-pressure polymerization of alkylene in the presence of a Ziegler catalyst or metallocene catalyst; Fischer-Tropsch waxes synthesized from coal or natural gas; paraffin waxes; olefin polymers obtained by the pyrolysis of high molecular weight olefin polymers; and synthetic hydrocarbon waxes obtained from the distillation residue of hydrocarbon obtained by the Arge method from synthesis gas containing carbon monoxide and hydrogen, as well as the synthetic hydrocarbon waxes provided by the hydrogenation of such synthetic hydrocarbon waxes.

The use is more preferred of waxes obtained by subjecting a hydrocarbon wax to fractionation by a press sweating method, solvent method, use of vacuum distillation, or fractional crystallization. Among the paraffin waxes, Fischer-Tropsch waxes and n-paraffin waxes in which the straight-chain component predominates are particularly preferred from the standpoint of the molecular weight distribution.

A single one of these waxes may be used by itself or two or more may be used in combination. The wax is preferably added at from 1 parts by mass to 20 parts by mass relative to 100 parts by mass of the binder resin.

A charge control agent may be used in the toner. Known charge control agents may be used as this charge control agent. Examples here are azo iron compounds, azo chromium compounds, azo manganese compounds, azo cobalt compounds, azo zirconium compounds, chromium compounds of carboxylic acid derivatives, zinc compounds of carboxylic acid derivatives, aluminum compounds of carboxylic acid derivatives, and zirconium compounds of carboxylic acid derivatives.

Aromatic hydroxycarboxylic acids are preferred for the aforementioned carboxylic acid derivative. A charge control resin may also be used. As necessary, a single species of charge control agent may be used or two or more species of charge control agents may be used in combination. The charge control agent is preferably used at from 0.1 parts by mass to 10 parts by mass relative to 100 parts by mass of the binder resin.

The toner may be used in the form of a two-component developer in mixture with a magnetic carrier. An ordinary magnetic carrier, e.g., of ferrite, magnetite, and so forth, or a resin-coated carrier may be used as the magnetic carrier. Also usable are dispersed magnetic body-type resin particles comprising a magnetic powder dispersed in a resin component, or porous magnetic core particles containing a resin in the voids.

The following, for example, can be used for the magnetic body component used in dispersed magnetic body-type resin particles: magnetite particle powder, maghemite particle powder, and magnetic iron oxide particle powder provided by the incorporation in the preceding of at least one selection from the oxides of silicon, the hydroxides of silicon, the oxides of aluminum, and the hydroxides of aluminum; magnetoplumbite-type ferrite particle powder that contains barium, strontium, or barium-strontium; and various magnetic iron compound particle powders, e.g., spinel-type ferrite particle powders that contain at least one selection from manganese, nickel, zinc, lithium, and magnesium.

Other than the magnetic body component, a magnetic iron compound particle powder may be used in combination with a nonmagnetic iron oxide particle powder such as hematite particle powder, a nonmagnetic hydrous ferric oxide particle powder such as goethite particles powder, or a nonmagnetic inorganic compound particle powder such as titanium oxide particle powder, silica particle powder, talc particle powder, alumina particle powder, barium sulfate particle powder, barium carbonate particle powder, cadmium yellow particle powder, calcium carbonate particle powder, and zinc white particle powder.

Magnetite and ferrite are examples of the material of the porous magnetic core particle. A specific example of ferrite is given by the following general formula.

$$(M1_2O)_x(M2O)_y(Fe_2O_3)_z$$

In this formula: M1 is a monovalent metal and M2 is a divalent metal, and x and y are each $0 \leq (x, y) \leq 0.8$ and z is $0.2 < z < 1.0$, where $x+y+z=1.0$.

The use of at least one metal atom selected from the group consisting of Li, Fe, Mn, Mg, Sr, Cu, Zn, and Ca as the M1 and M2 in the formula is preferred. Besides these, e.g., Ni, Co, Ba, Y, V, Bi, In, Ta, Zr, B, Mo, Na, Sn, Ti, Cr, Al, Si, and rare earths may also be used.

The magnetic carrier preferably comprises, for the resin-coated carrier, a magnetic carrier core particle and a resin-coating layer on the surface of the magnetic carrier core particle. The resin-coating layer, for example, coats the surface of the magnetic carrier core particle. The magnetic carrier core particle preferably is a porous magnetic core particle containing a resin in the voids.

A thermoplastic resin or a thermosetting resin may be used as the resin filled in the voids of the porous magnetic core particle.

Thermoplastic resins for use as this fill resin can be exemplified by novolac resins, saturated polyester resins, polyarylates, polyamide resins, and acrylic resins.

The thermosetting resins can be exemplified by phenolic resins, epoxy resins, unsaturated polyester resins, and silicone resins.

The method for coating the magnetic carrier core particle surface with the resin is not particularly limited, and examples are methods that carry out coating by a coating method such as an immersion method, a spray method, a brush coating method, or a fluidized bed. Immersion methods are preferred among these.

In order to control toner chargeability, the amount of resin coating the magnetic carrier core particle surface (i.e., the amount of the resin-coating layer) is preferably from 0.1 parts by mass to 5.0 parts by mass relative to 100 parts by mass of the magnetic carrier core particle.

The resin used for the resin-coating layer can be exemplified by acrylic resins, e.g., acrylate ester copolymers and methacrylate ester copolymers; styrene-acrylic resins, e.g., styrene-acrylate ester copolymers and styrene-methacrylate ester copolymers; fluorine-containing resins, e.g., polytetrafluoroethylene, tetrafluoroethylene hexafluoropropylene copolymers, monochlorotrifluoroethylene polymers, and polyvinylidene fluoride; as well as silicone resins, polyester resins, polyamide resins, polyvinyl butyral, aminoacrylate resins, ionomer resins, and polyphenylene sulfide resins.

A single of these resins may be used or a plurality may be used in combination. Acrylic resins are preferred.

Among the preceding, copolymers containing a (meth) acrylate ester having an alicyclic hydrocarbon group are particularly preferred from the standpoint of charge maintaining properties. The resin for the resin-coating layer preferably has a monomer unit provided by a (meth)acrylate ester having an alicyclic hydrocarbon group. That is, the resin of the resin-coating layer contains a polymer of monomer comprising at least a (meth)acrylate ester having an alicyclic hydrocarbon group.

Preferred examples of (meth)acrylate ester having an alicyclic hydrocarbon group are, e.g., cyclobutyl acrylate, cyclopentyl acrylate, cyclohexyl acrylate, cycloheptyl acrylate, dicyclopentenyl acrylate, dicyclopentanyl acrylate, cyclobutyl methacrylate, cyclopentyl methacrylate, cyclohexyl methacrylate, cycloheptyl methacrylate, dicyclopentenyl methacrylate, and dicyclopentanyl methacrylate.

The alicyclic hydrocarbon group is preferably a cycloalkyl group, with the number of carbons being preferably 3 to 10 and more preferably 4 to 8. One of these or a selection of two or more of these may be used.

The proportion, in the copolymer used in the resin-coating layer, of the monomer unit provided by (meth)acrylate ester having an alicyclic hydrocarbon group (i.e., the copolymerization proportion on a mass basis of the (meth)acrylate ester) is preferably from 5.0 mass % to 80.0 mass %, more preferably from 50.0 mass % to 80.0 mass %, and still more preferably from 70.0 mass % to 80.0 mass %. Within the range mentioned above, charge maintaining properties during long term use are improved.

Moreover, from the standpoints of charge stability, increasing the adherence between the magnetic carrier core particle and the resin-coating layer, and suppressing, e.g., localized exfoliation of the resin-coating layer, the resin in the resin-coating layer more preferably contains a macromonomer as a copolymerization component. An example of a specific macromonomer is given by Formula (B). That is, the resin in the resin-coating layer preferably has a monomer unit provided by macromonomer given by Formula (B).

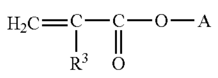

(B)

In Formula (B), A represents a polymer of at least one compound selected from the group consisting of methyl acrylate, methyl methacrylate, butyl acrylate, butyl methacrylate, 2-ethylhexyl acrylate, 2-ethylhexyl methacrylate, styrene, acrylonitrile, and methacrylonitrile. $R^3$ is H or $CH_3$.

The A is preferably a polymer of methyl methacrylate.

In order to improve the adherence between the magnetic carrier core particle and the resin-coating layer, the weight-average molecular weight of the macromonomer is preferably 3,000 to 10,000 and is more preferably 4,000 to 7,000.

In order to improve the adherence between the magnetic carrier core particle and the resin-coating layer, the proportion of the macromonomer-derived monomer unit in the resin used in the resin-coating layer is preferably from 0.5 mass % to 30.0 mass %, more preferably from 10.0 mass % to 30.0 mass %, and still more preferably from 20.0 mass % to 25.0 mass %.

Measurement of the Weight-Average Molecular Weight of the Macromonomer

The weight-average molecular weight is measured using gel permeation chromatography (GPC) and using the following procedure.

The measurement sample is first prepared as follows.

A sample (the coating resin is separated from the magnetic carrier and is fractionated with a fractionator to give the sample) is mixed at a concentration of 5 mg/mL with tetrahydrofuran (THF), and the sample is dissolved in the THF by standing for 24 hours at room temperature. This is followed by filtration across a sample treatment filter (Sample Pretreatment Cartridge H-25-2, Tosoh Corporation) to provide the GPC sample.

The measurement is then run using a GPC measurement instrument (FILC-8120GPC, Tosoh Corporation) in accordance with the operating manual provided with the instrument and using the following measurement conditions.

Measurement Conditions

Instrument: "HLC8120 GPC" high-performance GPC (Tosoh Corporation)

Column: 7-column train of Shodex KF-801, 802, 803, 804, 805, 806, and 807 (Showa Denko Kabushiki Kaisha)

Eluent: THF

Flow rate: 1.0 mL/min

Oven temperature: 40.0° C.

Amount of sample injection: 0.10 mL

For the calibration curve, a molecular weight calibration curve constructed using polystyrene resin standards (Tosoh Corporation, TSK Standard Polystyrene F-850, F-450, F-288, F-128, F-80, F-40, F-20, F-10, F-4, F-2, F-1, A-5000, A-2500, A-1000, A-500) is used to determine the weight-average molecular weight of the sample.

The toner comprises the toner particle and the silica fine particle A on the surface of the toner particle. The toner can be obtained by external addition of the silica fine particle A as an external additive to the toner particle. The content of the silica fine particle A in the toner, relative to 100 parts by mass of the toner particle, is preferably 0.01 to 10.0 parts by mass, more preferably 0.2 to 3.0 parts by mass, still more preferably 0.4 to 2.0 parts by mass, even more preferably 0.8 to 2.0 parts by mass, and yet more preferably 1.0 to 1.7 parts by mass.

By constituting in this way, the silica fine particle A can sufficiently coat the toner particle and the advantageous effect of the silica fine particle A can be more appropriately exhibited. As a result, it is possible to obtain a toner which can achieve high charge maintaining properties over a long period of time while better suppressing charging unevenness caused by transfer voids or contamination of components even in a case where higher image quality or higher speed is sought. In addition, the compound having a siloxane structure is moderately free at the surface of silica fine particle A, and the release properties of the toner are improved. As a result, even in a case where higher image quality or higher speed is sought, transfer voids can be better suppressed.

External addition of external additive, e.g., the silica fine particle A and the silica fine particle B, to the toner particle can be carried out by mixing the toner particle with the external additive using a mixer as described in the following.

The mixer can be exemplified by the following: Henschel mixer (Mitsui Mining Co., Ltd.); Supermixer (Kawata Mfg. Co., Ltd.); Ribocone (Okawara Corporation); Nauta mixer, Turbulizer, and Cyclomix (Hosokawa Micron Corporation); Spiral Pin Mixer (Pacific Machinery & Engineering Co., Ltd.); and Loedige Mixer (Matsubo Corporation).

As mentioned above, the toner preferably has both the silica fine particle A and the silica fine particle B, which is different from the silica fine particle A. It is preferable for a part of a silica fine particle B to be embedded at the surface of the toner particle. In a silica fine particle B that is embedded at the surface of the toner particle, the degree of embedding of the silica fine particle B in the toner particle is preferably 5 to 50%, more preferably 10 to 25%, and further preferably 12 to 20%.

By setting the degree of embedding of the silica fine particle B to fall within the range mentioned above, in a case where the silica fine particle B is surface treated, strong chemical interactions are exhibited between the toner particle and polar groups (O-R) at terminals of siloxane chains at the surface of the silica fine particle B. By constituting in this way, the silica fine particle B is less likely to become detached from the toner particle even if the toner particle is subjected to an impact.

In addition, because of the silica fine particle A and the silica fine particle B strongly interact through the compound having a siloxane structure, such as a silicone oil, that is present at the surface of the silica fine particle A, detachment of the silica fine particle A from the toner particle is also suppressed even if the toner particle is subjected to an impact.

As a result, because the silica fine particle A is present in a stable manner at the toner particle surface, the state of charge at the toner surface is kept more constant and more stable, and charge maintaining properties are further improved. In addition, the compound having a siloxane structure is moderately free at the surface of silica fine particle A, and the release properties of the toner are improved. As a result, even in a case where higher image quality or higher speed is sought, transfer voids can be better suppressed.

Calculation of Degree of Embedding of Silica Fine Particle B at Toner Particle Surface First, as a pretreatment, silica fine particles which are not embedded or have a low degree of embedding are separated from the toner. 20 g of "Contaminon N" (a 10 mass % aqueous solution of a neutral detergent for cleaning precision measurement equipment, which has a pH of 7 and comprises a non-ionic surfactant, an anionic surfactant and an organic builder) is weighed out into a vial having a capacity of 50 mL, and mixed with 1 g of toner.

The vial is placed on a KM Shaker (model: V.SX) produced by Iwaki Sangyo Co., Ltd., the speed is set to 50, and the vial is shaken for 30 seconds. As a result, silica fine particles that are not embedded move from the toner particle surface to the aqueous solution side.

Next, in the case of a magnetic toner containing a magnetic body, a sample is obtained by separating silica fine particles that have migrated to a supernatant liquid in a state whereby toner particles are bound using a neodymium magnet, and then evaporating the precipitated toner particles to dryness by carrying out vacuum drying (40° C./24 hours).

Moreover, in the case of a non-magnetic toner, a centrifugal separator (an H-9R produced by Kokusan Co., Ltd.) is used to separate the toner (at 1000 rpm for 5 minutes) into toner particles and non-embedded silica fine particles that have migrated to the supernatant liquid. Remaining toner particles are subjected to suction filtration, and a toner particle powder is collected and dried.

Toner particles are fixed to a sample stand of an electron microscope using a carbon tape and then observed under the following conditions. Images are taken after selecting a large angle of inclination of the toner particle surface (for example, 70 to 110°, and preferably approximately 90°).

Apparatus used: SU8220 produced by Hitachi High-Technologies Corporation

Accelerating voltage: 2 kV

Radiation current: 10 μA

Image acquisition: secondary electron detector

Magnification ratio: 50,000 times

Pixel count: 1280×960 (the size of one pixel is approximately 2 nm×approximately 2 nm)

Acquired images are binarized using Image J image analysis software (available from https://imagej.nih.gov/ij/). As shown in FIG. 1, a silica fine particle B is fitted to a perfect circle (a perfect circle is created by [Oval selections] (the shape is fixed as a perfect circle when the operation is carried out with the shift key held down), and the degree of embedding is calculated using the formula below from the diameter (a) of the silica fine particle B and the length (b) of the embedded part of the silica fine particle B. The length (b) is measured on a straight line that passes through the apex in the depth direction on the embedded side of the silica fine particle B that has been fitted to a perfect circle and the center of the silica fine particle B.

Degree of embedding (%)=length (*b*) of embedded part of silica fine particle *B*/diameter (*a*) of silica fine particle *B*

This degree of embedding is calculated for at least 100 silica fine particles B, and the arithmetic mean value of these is taken to be the degree of embedding of the silica fine particle B.

At the toner surface, a silica fine particle B can be differentiated from a silica fine particle A by assessing particle diameter.

The degree of embedding of silica fine particle B can be controlled by, for example, adjusting the temperature when toner particles and silica fine particles B are mixed using a mixer such as one mentioned above. In addition, the degree of embedding can also be controlled by adjusting conditions (the temperature of the treatment atmosphere or the exhaust flow rate in the treatment space) when surface treating the toner particle (embedding the silica fine particle B) after mixing the toner particle with the silica fine particle B. The surface treatment is preferably a heat treatment. An example thereof is a method of treating with a hot air current.

The toner particle can be heat treated using apparatuses such as those mentioned below. A hybridization system (produced by Nara Machinery Co., Ltd.), a Nobilta (produced by Hosokawa Micron Corp.), a Mechanofusion system (produced by Hosokawa Micron Corp.), a Faculty (produced by Hosokawa Micron Corp.), an Innomizer (produced by Hosokawa Micron Corp.), a Theta Composer (produced by Tokuju Co., Ltd.), a Mechanomill (produced by Okada Seiko Co., Ltd.) or a Meteor Rainbow MR Type (Nippon Pneumatic MFG Co., Ltd.)

Moreover, in a case where a combination of silica fine particle B and silica fine particle A is used, it is preferable to carry out a step for embedding the silica fine particle B using a method such as that described above, and then externally add the silica fine particle A. The toner is preferably one obtained using the method described below.

That is, the toner production method preferably has:

a step for obtaining a toner particle;

a step for preparing the silica fine particle A and silica fine particle B;

a step for externally adding and mixing the silica fine particle B to the obtained toner particle;

a step for heat treating the toner particle to which the silica fine particle B have been externally added and mixed; and a step for externally adding and mixing the silica fine particle A to the heat treated toner particle;

The content of the silica fine particle B is preferably from 0.5 to 10.0 parts by mass, more preferably from 1.0 to 8.0 parts by mass, and further preferably from 2.0 to 6.0 parts by mass, relative to 100 parts by mass of the toner particle.

A specific example will now be given of a method for surface treating a toner particle (for example, a toner particle to which the silica fine particle B have been externally added and mixed) by means of a hot air current using the heat treatment apparatus shown in FIG. 2. This exemplified toner particle is referred to as a treatment object.

A treatment object quantitatively supplied from a raw material quantitative supply means 1 is fed to an inlet tube 3 disposed vertically above a raw material supply means by means of a compressed gas regulated by a compressed gas flow rate regulation means 2. The treatment object that passes through the inlet tube 3 is uniformly dispersed by a conical protruding member 4 provided in the center of the raw material supply means, is then fed to supply tubes 5 that extend in a radial manner in eight directions, and is then fed to a treatment chamber 6 in which a heat treatment is carried out.

At this point, the flow of the treatment object supplied to the treatment chamber 6 is restricted by a restriction means 9 which is provided in the treatment chamber 6 and is used to restrict the flow of the treatment object. Therefore, the treatment object supplied to the treatment chamber 6 is subjected to the heat treatment while being swirled in the treatment chamber 6, and then cooled.

A hot air current, which is used to heat treat the supplied treatment object, is supplied from a hot air current supply means 7, partitioned by a partitioning component 12, and swirled and introduced in a spiral manner into the treatment chamber 6 by means of a swirling component 13 that is used to swirl the hot air current. In this configuration, the swirling component 13 that is used to swirl the hot air current has a plurality of blades, and swirling of the hot air current can be controlled by the number and angle of these blades (moreover, 11 denotes an outlet of the hot air current supply means).

The hot air current supplied to the treatment chamber 6 preferably has a temperature of from 100° C. to 300° C., and more preferably from 130° C. to 190° C., at the outlet of the hot air current supply means 7. If the temperature at the outlet part of the hot air current supply means 7 falls within the range mentioned above, it is possible to prevent the treatment object from fusing and coalescing as a result of excessive heating, and also possible to make the degree of embedding of the silica fine particle B fall within a preferred range. The hot air current is supplied from the hot air current supply means 7.

Furthermore, heat treated resin particles are cooled by a cold air current supplied from a cold air current supply means 8. The temperature of the cold air current supplied from the cold air current supply means 8 is preferably from −20° C. to 30° C. If the temperature of the cold air current falls within the range mentioned above, it is thought that the heat treated treatment object can be efficiently cooled and is unlikely to fuse or coalesce. In addition, the absolute moisture content in the cold air current is preferably from 0.5 $g/m^3$ to 15.0 $g/m^3$.

Next, the cooled treatment object is recovered by a recovery means 10 located at the bottom of the treatment chamber 6. Moreover, a blower (not shown) is provided before the recovery means 10, and a configuration in which suction conveying occurs is formed as a result.

In addition, a powder particle supply port 14 is provided in such a way that the swirling direction of the supplied treatment object is the same as the swirling direction of the hot air current, and the recovery means 10 is also provided in a tangential direction at the outer periphery of the treatment chamber 6 so that the swirling direction of the swirled treatment object is maintained. Furthermore, the apparatus is configured so that the cold air current supplied from the cold air current supply means 8 is supplied from a horizontal and tangential direction from the outer periphery of the apparatus to the inner peripheral surface thereof.

The swirling direction of the treatment object supplied from the powder particle supply port 14, the swirling direction of the cold air current supplied from the cold air current supply means 8 and the swirling direction of the hot air current supplied from the hot air current supply means 7 are all the same direction. As a result, turbulence does not occur in the treatment chamber, swirling flow is enhanced in the apparatus, a strong centrifugal force is applied to the yet-to-be heat treated treatment object, and dispersibility of the treatment object is further improved, meaning that it is possible to obtain toner particles which undergo little particle coalescence.

The method for producing the toner particle in the process of obtaining the toner particle is not particularly limited, and production can be carried out using known methods. Examples here are the pulverization method, emulsion aggregation method, suspension polymerization method, and dissolution suspension method.

A toner particle produced by the pulverization method may be produced, for example, proceeding as follows.

The binder resin, colorant, other optional additives, and so forth are thoroughly mixed using a mixer such as a Henschel mixer or ball mill. The resulting mixture is melt-kneaded using a heated kneader, for example, a twin-screw kneading extruder, hot roll, kneader, or extruder. A wax, magnetic iron oxide particle, and metal-containing compound may also be added at this time.

The melt-kneaded material is cooled and solidified and then pulverized and classified to obtain a toner particle. Here, by adjusting the exhaust temperature at the time of fine pulverization, it is possible to control the degree of embedding of silica fine particles at the toner particle surface. A toner can be obtained by mixing the toner particles and an external additive such as the silica fine particles A using a mixer such as a Henschel mixer.

The mixer can be exemplified by the following: Henschel mixer (Mitsui Mining Co., Ltd.); Supermixer (Kawata Mfg. Co., Ltd.); Ribocone (Okawara Corporation); Nauta mixer, Turbulizer, and Cyclomix (Hosokawa Micron Corporation); Spiral Pin Mixer (Pacific Machinery & Engineering Co., Ltd.); and Loedige Mixer (Matsubo Corporation).

The kneader can be exemplified by the following: KRC Kneader (Kurimoto, Ltd.); Buss Ko-Kneader (Buss Corp.); TEM extruder (Toshiba Machine Co., Ltd.); TEX twin-screw kneader (The Japan Steel Works, Ltd.); PCM Kneader (lkegai Ironworks Corporation); three-roll mills, mixing roll mills, and kneaders (Inoue Manufacturing Co., Ltd.); Kneadex (Mitsui Mining Co., Ltd.); Model MS pressure kneader and Kneader-Ruder (Moriyama Mfg. Co., Ltd.); and Banbury mixer (Kobe Steel, Ltd.).

The pulverizer can be exemplified by the following: Counter Jet Mill, Micron Jet, and Inomizer (Hosokawa Micron Corporation); IDS mill and PJM Jet Mill (Nippon Pneumatic Mfg. Co., Ltd.); Cross Jet Mill (Kurimoto, Ltd.); Ulmax (Nisso Engineering Co., Ltd.); SK Jet-O-Mill (Seishin Enterprise Co., Ltd.); Krypton (Kawasaki Heavy Industries, Ltd.); Turbo Mill (Turbo Kogyo Co., Ltd.); and Super Rotor (Nisshin Engineering Inc.).

Following pulverization, the degree of embedding of silica fine particles at the toner particle surface can, if necessary, be controlled by surface treating the toner particles using a hybridization system (produced by Nara Machinery Co., Ltd.), a Nobilta (produced by Hosokawa Micron Corp.), a Mechanofusion system (produced by Hosokawa Micron Corp.), a Faculty (produced by Hosokawa Micron Corp.), an hmomizer (produced by Hosokawa Micron Corp.), a Theta Composer (produced by Tokuju Co., Ltd.), a Mechanomill (produced by Okada Seiko Co., Ltd.) or an MR Type Meteor Rainbow (Nippon Pneumatic MFG Co., Ltd.).

The classifier can be exemplified by the following: Classiel, Micron Classifier, and Spedic Classifier (Seishin Enterprise Co., Ltd.); Turbo Classifier (Nisshin Engineering Inc.); Micron Separator, Turboplex (ATP), and TSP Separator (Hosokawa Micron Corporation); Elbow Jet (Nittetsu Mining Co., Ltd.); Dispersion Separator (Nippon Pneumatic Mfg. Co., Ltd.); and YM Microcut (Yasukawa Shoji Co., Ltd.).

Screening devices that can be used to screen out the coarse particles can be exemplified by the following: Ultrasonic (Koei Sangyo Co., Ltd.), Rezona Sieve and Gyro-Sifter (Tokuju Corporation), Vibrasonic System (Dalton Co., Ltd.), Soniclean (Sintokogio, Ltd.), Turbo Screener (Turbo Kogyo Co., Ltd.), Microsifter (Makino Mfg. Co., Ltd.), and circular vibrating sieves.

A toner particle may be produced by the emulsion aggregation method, for example, proceeding as follows.

Step of Preparing a Resin Fine Particle Dispersion (Preparation Step)

For example, a uniform solution is formed by dissolving a binder resin component in an organic solvent. This is followed on an optional basis by the addition of a basic compound and/or a surfactant. Resin fine particles of the binder resin are formed by the gradual addition of an aqueous medium to this solution while applying shear force to the solution using, for example, a homogenizer. The organic solvent is finally removed to produce a resin fine particle dispersion in which resin fine particles are dispersed.

During the preparation of the resin fine particle dispersion, the amount of addition of the resin component that is dissolved in the organic solvent, expressed relative to 100 parts by mass of the organic solvent, is preferably from 10 parts by mass to 50 parts by mass and more preferably from 30 parts by mass to 50 parts by mass.

Any organic solvent capable of dissolving the resin component may be used, but solvents exhibiting a high solubility for olefin resins, e.g., toluene, xylene, ethyl acetate, and so forth, are preferred.

There are no particular limitations on the surfactant. The following are examples: anionic surfactants such as the salts of sulfate esters, sulfonate salts, carboxylate salts, phosphate esters, and soaps; cationic surfactants such as amine salts and quaternary ammonium salts; and nonionic surfactants such as polyethylene glycols, ethylene oxide adducts on alkylphenols, and polyhydric alcohol systems.

The basic compound can be exemplified by inorganic bases such as sodium hydroxide and potassium hydroxide and by organic bases such as triethylamine, trimethylamine, dimethylaminoethanol, and diethylaminoethanol. A single species of basic compound may be used by itself or two or more species may be used in combination.

Aggregation Step

The aggregation step is a step of forming aggregate particles by preparing a mixture by mixing, as necessary, a colorant fine particle dispersion, wax fine particle dispersion, and silicone oil emulsion into the resin fine particle dispersion and then aggregating the fine particles present in the thusly prepared mixture.

A favorable example of the method for forming the aggregate particles is a method in which an aggregating agent is added to and mixed with the mixture and the temperature is raised and/or, e.g., mechanical energy is suitably applied.

The colorant fine particle dispersion is prepared by the dispersion of a colorant as described above. The colorant fine particles are dispersed using a known method, but the use is preferred of, for example, a rotary shear homogenizer; a media-based disperser such as a ball mill, sand mill, or attritor; or a high-pressure countercollision disperser. A surfactant or polymeric dispersing agent that supports dispersion stability can also be added on an optional basis.

The wax fine particle dispersion and the silicone oil emulsion are prepared by dispersing the respective materials in an aqueous medium. The respective materials may be dispersed using a known method, but the use is preferred of, for example, a rotary shear homogenizer; a media-based disperser such as a ball mill, sand mill, or attritor; or a high-pressure countercollision disperser. A surfactant or polymeric dispersing agent that supports dispersion stability can also be added on an optional basis.

The aggregating agent can be exemplified by the metal salts of monovalent metals such as sodium, potassium, and so forth; metal salts of divalent metals such as calcium, magnesium, and so forth; metal salts of trivalent metals such as iron, aluminum, and so forth; and polyvalent metal salts such as polyaluminum chloride. Viewed from the standpoint of the ability to control the particle diameter in the aggregation step, metal salts of divalent metals, e.g., calcium chloride, magnesium sulfate, and so forth, are preferred.

The addition and mixing of the aggregating agent is preferably carried out in the temperature range from room temperature to 75° C. When mixing is performed using this temperature condition, it proceeds in a state in which the aggregation is stable. Mixing can be carried out using, for example, a known mixing apparatus, homogenizer, or mixer.

Fusion Step

The fusion step is a step in which the aggregate particle is fused or coalesced, preferably by heating to at least the melting point of the olefin resin, to produce a particle in which the surface of the aggregate particle has been smoothened.

Prior to the fusion step, for example, a chelating agent, pH regulator, surfactant, and so forth may be introduced as appropriate in order to prevent the obtained resin particles from melt-adhering to each other.

The chelating agent can be exemplified by ethylenediaminetetraacetic acid (EDTA) and its alkali metal salts, for example, its Na salt; sodium gluconate; sodium tartrate; potassium citrate and sodium citrate; nitrilotriacetate (NTA) salts; and highly water-soluble polymers that contain both the COOH and OH functionalities (polyelectrolytes).

With regard to the duration of the fusion step, shorter times will suffice at higher heating temperatures while longer times will be required at lower heating temperatures. Thus, the duration of heating/fusion cannot be unconditionally specified because it depends on the heating temperature; however, it will generally be about from minutes to 10 hours.

Cooling Step

This is a step of cooling the temperature of the resin particle-containing aqueous medium obtained in the fusion step. While not a particular limitation, a specific cooling rate is about 0.1 to 50° C./minute.

Washing Step

The impurities in the resin particle can be removed by subjecting the resin particles produced via the preceding steps to repeated washing and filtration.

Specifically, preferably the resin particle is washed using an aqueous solution containing a chelating agent, e.g., ethylenediaminetetraacetic acid (EDTA) or its sodium salt, and additionally washed with pure water.

The metal salt, surfactant, and so forth in the resin particle can be removed by repeating the pure water wash+filtration a plurality of times. Filtration is performed preferably from 3 to 20 times from the standpoint of the production efficiency, with 3 to times being more preferred.

Drying and Classification Step

The toner particle can be obtained by drying the washed resin particle and carrying out classification as appropriate.

A toner particle produced by the dissolution suspension method may be produced, for example, proceeding as follows.

In the dissolution suspension method, a resin composition is obtained by dissolving the binder resin component in an organic solvent; this resin composition is dispersed in an aqueous medium to granulate the resin composition into particles; and the organic solvent present in the resin composition particles is removed to produce a toner particle.

The dissolution suspension method is adaptable as long as the resin component can dissolve in an organic solvent, and in addition provides for easy shape control as a function of the conditions in solvent removal.

A toner production method using the dissolution suspension method is specifically described in the following, but there is no limitation to this.

Resin Component Dissolution Step

In the resin component dissolution step, the binder resin and as necessary other components, e.g., colorant, wax, silicone oil, and so forth, are dissolved or dispersed in an organic solvent to prepare a resin composition.

Any solvent that is an organic solvent that can dissolve the resin component can be used as the organic solvent used here. Specific examples are toluene, xylene, chloroform, methylene chloride, and ethyl acetate. The use of toluene and ethyl acetate is preferred for the ease of solvent removal and promotion of crystallization of crystalline resin.

The amount of use of the organic solvent is not limited, but should be an amount that provides a viscosity that enables the resin composition to disperse and granulate in a poor solvent, e.g., water. Specifically, the mass ratio between the resin component and optional other components, e.g., colorant, wax, and silicone oil, and the organic solvent is preferably 10/90 to 50/50 from the standpoints of the granulatability, infra, and the toner particle production efficiency.

On the other hand, the colorant, wax, and silicone oil need not undergo dissolution in the organic solvent and may undergo dispersion. When the colorant, wax, and silicone oil are employed in a dispersed condition, dispersion is preferably performed using a disperser such as a bead mill.

Granulation Step

The granulation step is a step of producing particles of the obtained resin composition by dispersing the resin composition in an aqueous medium using a dispersing agent so as to provide a prescribed toner particle diameter.

Water is mainly used as the aqueous medium.

In addition, this aqueous medium preferably contains from 1 mass % to 30 mass % of a monovalent metal salt. The incorporation of the monovalent metal salt serves to suppress diffusion of the organic solvent in the resin composition into the aqueous medium and to increase the crystallinity of the resin component present in the resulting toner particle.

This facilitates the appearance of an excellent antiblocking behavior by the toner and facilitates the appearance of an excellent particle size distribution for the toner.

The monovalent metal salt can be exemplified by sodium chloride, potassium chloride, lithium chloride, and potassium bromide, where among sodium chloride and potassium chloride are preferred.

In addition, the mixing ratio (mass ratio) between the aqueous medium and resin composition is preferably aqueous medium/resin composition=90/10 to 50/50.

There are no particular limitations on the dispersing agent, and a cationic, anionic, or nonionic surfactant is used as an organic dispersing agent, wherein anionic surfactants are preferred.

Examples here sodium alkylbenzenesulfonate, sodium α-olefinsulfonate, sodium alkylsulfonate, and sodium alkyl diphenyl ether disulfonate. Inorganic dispersing agents, on the other hand, can be exemplified by tricalcium phosphate, hydroxyapatite, calcium carbonate fine particles, titanium oxide fine particles, and silica fine particles.

The inorganic dispersing agent tricalcium phosphate is preferred among the preceding. The reasons for this are its granulation performance and stability and because it has very little negative effect on the properties of the resulting toner.

The amount of addition of the dispersing agent is determined in conformity to the particle diameter of the granulate, and larger amounts of dispersing agent addition provide smaller particle diameters. Due to this, the amount of addition for the dispersing agent will vary depending on the desired particle diameter, but use in the range of 0.1 to 15 mass % with reference to the resin composition is preferred.

The production of the resin composition particles in the aqueous medium is preferably carried out under the application of high-speed shear. Devices that apply high-speed shear can be exemplified by various high-speed dispersers and ultrasound dispersers.

Solvent Removal Step

In the solvent removal step, the organic solvent contained in the resulting resin composition particle is removed to produce a toner particle. This organic solvent removal may be performed while stirring.

Washing, Drying, and Classification Step

After the solvent removal step, a washing and drying step may be executed in which washing is performed a plurality of times with, e.g., water, and the toner particle is then filtered off and dried. When a dispersing agent that dissolves under acidic conditions, e.g., tricalcium phosphate, has been used as the dispersing agent, preferably washing with, e.g., hydrochloric acid, is carried out followed by washing with water. The execution of washing can remove the dispersing agent used for granulation. The toner particle can be obtained by following washing with filtration, drying, and classification as appropriate.

A toner particle produced by the suspension polymerization method may be produced, for example, as follows.

A polymerizable monomer composition is prepared in which polymerizable monomer that will produce the binder resin, colorant, a wax component, a polymerization initiator, and so forth, are dissolved or dispersed to uniformity using a disperser such as a homogenizer, ball mill, ultrasound disperser, and so forth. After granulation of the polymerizable monomer composition into particles by dispersing the polymerizable monomer composition in an aqueous medium, a toner particle is obtained by polymerizing the polymerizable monomer in the particles composed of the polymerizable monomer composition.

This polymerizable monomer composition preferably is a polymerizable monomer composition prepared by mixing a dispersion of the colorant dispersed in a first polymerizable monomer (or a portion of the polymerizable monomer) with at least a second polymerizable monomer (or the remaining polymerizable monomer). That is, the presence of the colorant in the polymer particle in a more thoroughly dispersed state can be achieved by bringing the colorant into a thoroughly dispersed state in the first polymerizable monomer and subsequently mixing with the second polymerizable monomer along with other toner materials.

As necessary, the obtained toner particle may be filtered, washed, dried, and classified using known methods.

Step for Adding External Additive to Toner Particle

A toner can be obtained by mixing the obtained toner particles and external additive (the silica fine particle A and, if necessary, the silica fine particle B) using a mixer such as a Henschel mixer.

When both silica fine particle A and silica fine particle B are used, silica fine particle A and silica fine particle B may be externally added to the toner particle once. As noted above, the external addition of silica fine particle B and the external addition of silica fine particle A are preferably carried out divided up.

In the step of externally adding the silica fine particle B to the obtained toner particle by mixing, the silica fine particle B may be mixed with the toner particle, for example, using a mixer such as a Henschel mixer.

Next, in the step for heat treating the toner particles to which the silica fine particle B has been externally added and mixed, the heat treatment is preferably carried out using the heat treatment apparatus described above and using the toner particles to which the silica fine particle B has been externally added and mixed as the treatment object.

In addition, in the step for externally adding and mixing the silica fine particle A to the heat treated toner particles, a toner can be obtained by mixing the heat treated toner particles with the silica fine particle A using, for example, a mixer such as a Henschel mixer.

EXAMPLE

The basic constitution and features of the present invention are described in the preceding, while the present invention is specifically described in the following based on examples. However, the present invention is in no way limited thereby. Unless specifically indicated otherwise, parts and % are on a mass basis.

Binder Resin 1 Production Example

Bisphenol A/ethylene oxide (2.2 mol adduct): 50.0 mol parts

Bisphenol A/propylene oxide (2.2 mol adduct): 50.0 mol parts

Terephthalic acid: 90.0 mol parts

Trimellitic anhydride: 10.0 mol parts 100 parts by mass of the above-indicated monomer constituting polyester units was mixed in a 5-liter autoclave together with 500 ppm titanium tetrabutoxide.

A reflux condenser, water separation device, $N_2$ gas introduction line, thermometer, and stirring device were then installed on the autoclave and a condensation polymerization reaction was run at 230° C. while introducing $N_2$ gas into the autoclave. The reaction time was adjusted to provide the desired softening point, and, after the completion of the reaction, removal from the container, cooling, and pulverization yielded the binder resin 1. Binder resin 1 had a softening point of 130° C. and a Tg of 57° C.

The softening point was measured as follows.

Measurement of the Softening Point

The softening point is measured using a "Flowtester CFT-500D Flow Property Evaluation Instrument" (Shimadzu Corporation), which is a constant-load extrusion-type capillary rheometer, in accordance with the manual provided with the instrument. With this instrument, while a constant load is applied by a piston from the top of the measurement sample, the measurement sample filled in a cylinder is heated and melted and the melted measurement sample is extruded from a die at the bottom of the cylinder; a flow curve showing the relationship between piston stroke and temperature can be obtained from this.

The "melting temperature by the ½ method", as described in the manual provided with the "Flowtester CFT-500D Flow Property Evaluation Instrument", is used as the softening point. The melting temperature by the ½ method is determined as follows.

First, ½ of the difference between the piston stroke Smax at the completion of outflow and the piston stroke Smin at the start of outflow is determined (this value is designated as X, where X=(Smax−Smin)/2). The temperature in the flow curve when the piston stroke in the flow curve reaches the sum of X and Smin is the melting temperature by the ½ method.

The measurement sample used is prepared by subjecting approximately 1.3 g of the sample to compression molding for 60 seconds at 10 MPa in a 25° C. environment using a tablet compression molder (for example, NT-100H, NPa System Co., Ltd.) to provide a cylindrical shape with a diameter of approximately 8 mm. The measurement conditions with the CFT-500D are as follows.

Test mode: ramp-up method

Start temperature: 50° C.

Saturated temperature: 200° C.

Measurement interval: 1.0° C.

Ramp rate: 4.0° C./min

Piston cross section area: 1.000 cm 2

Test load (piston load): 10.0 kgf/cm 2 (0.9807 MPa)

Preheating time: 300 seconds

Diameter of die orifice: 1.0 mm

Die length: 1.0 mm

Silica Fine Particle A1 Production Example 500 g of a fumed silica with a BET specific surface area of 145 $m^2/g$ (the silica fine particle substrate) was introduced into a reactor and was heated under a nitrogen purge while stirring; the temperature in the reactor was controlled to 330° C. Surface treatment of the silica fine particle substrate was then performed by supplying octamethylcyclotetrasiloxane in vapor form as the surface treatment agent into the reactor at 10 g/minute for 60 minutes, followed by heating and stirring for 180 minutes.

The unreacted surface treatment agent was then removed, and the following surface treatment was subsequently performed to yield silica fine particle A1: supply, while stirring under a nitrogen purge, by spraying of a solution of 50 g of polydimethylsiloxane (kinematic viscosity at a temperature of 25° C.: 100 $mm^2/s$) diluted with 500 g of hexane, then stirring and heating for 120 minutes. Table 1 provides the first-stage treatment conditions, while Table 2-1 and Table 2-2 provide the second-stage treatment conditions and the properties of the silica fine particle A1.

Silica Fine Particles A2 to A18 Production Example

Silica fine particles A2 to A18 were obtained by carrying out production proceeding as for the silica fine particle A1, but changing the fumed silica (silica fine particle substrate), surface treatment agent, and treatment conditions as shown in Tables 1, 2-1 and 2-2. The properties of silica fine particles A2 to A18 are given in Table 2-2.

TABLE 1

| | First-stage treatment conditions | | | | | |
|---|---|---|---|---|---|---|
| Silica fine particle No. | Surface treatment agent | BET specific surface area of silica fine particle substrate ($m^2/g$) | Amount of treatment agent (g) | Amount of treatment agent (parts) | Treatment temperature (° C.) | Treatment time (min) |
| A1 | Octamethylcyclotetrasiloxane | 145 | 600 | 120 | 330° C. | 180 |
| A2 | Octamethylcyclotetrasiloxane | 200 | 600 | 120 | 330° C. | 180 |
| A3 | Octamethylcyclotetrasiloxane | 300 | 600 | 120 | 330° C. | 180 |
| A4 | Octamethylcyclotetrasiloxane | 145 | 480 | 96 | 330° C. | 120 |
| A5 | Octamethylcyclotetrasiloxane | 145 | 360 | 72 | 330° C. | 60 |
| A6 | Octamethylcyclotetrasiloxane | 145 | 360 | 72 | 300° C. | 60 |
| A7 | Octamethylcyclotetrasiloxane | 90 | 360 | 72 | 300° C. | 60 |
| A8 | Octamethylcyclotetrasiloxane | 90 | 360 | 72 | 300° C. | 60 |
| A9 | Octamethylcyclotetrasiloxane | 90 | 360 | 72 | 300° C. | 60 |
| A10 | Octamethylcyclotetrasiloxane | 90 | 360 | 72 | 300° C. | 60 |
| A11 | Octamethylcyclotetrasiloxane | 90 | 240 | 48 | 300° C. | 30 |
| A12 | Hexamethylcyclotrisiloxane | 90 | 240 | 48 | 300° C. | 30 |
| A13 | Decamethylcyclopentasiloxane | 90 | 240 | 48 | 300° C. | 30 |
| A14 | Decamethylcyclopentasiloxane | 90 | 210 | 42 | 300° C. | 30 |

TABLE 1-continued

| Silica fine particle No. | First-stage treatment conditions: Surface treatment agent | BET specific surface area of silica fine particle substrate ($m^2/g$) | Amount of treatment agent (g) | Amount of treatment agent (parts) | Treatment temperature (° C.) | Treatment time (min) |
|---|---|---|---|---|---|---|
| A15 | Decamethylcyclopentasiloxane | 90 | 180 | 36 | 300° C. | 30 |
| A16 | Hexamethyldisilazane | 145 | 480 | 96 | 170° C. | 60 |
| A17 | Octamethylcyclotetrasiloxane | 145 | 480 | 96 | 280° C. | 30 |
| A18 | — | — | — | — | — | — |

In Tables 1, 2-1 and 2-2, the amount (number of parts) of a treatment agent indicates the number of parts by mass of a surface treatment agent relative to 100 parts by mass of a silica fine particle substrate.

TABLE 2-1

| Silica fine particle No. | Second-stage treatment conditions: Surface treatment agent | Kinematic viscosity at a temperature of 25° C. ($mm^2/s$) | Amount of treatment agent (parts) | Treatment temperature (° C.) | Treatment time (min) |
|---|---|---|---|---|---|
| A1 | Polydimethylsiloxane | 100 | 10 | 330° C. | 120 |
| A2 | Polydimethylsiloxane | 100 | 10 | 330° C. | 60 |
| A3 | Polydimethylsiloxane | 100 | 10 | 330° C. | 60 |
| A4 | Polydimethylsiloxane | 50 | 15 | 300° C. | 60 |
| A5 | Polydimethylsiloxane | 50 | 20 | 300° C. | 60 |
| A6 | Polydimethylsiloxane | 200 | 5 | 300° C. | 60 |
| A7 | Polydimethylsiloxane | 200 | 5 | 300° C. | 60 |
| A8 | Polydimethylsiloxane | 300 | 5 | 300° C. | 60 |
| A9 | Polydimethylsiloxane | 300 | 5 | 300° C. | 30 |
| A10 | Polydimethylsiloxane | 300 | 3 | 300° C. | 30 |
| A11 | Polydimethylsiloxane | 300 | 3 | 280° C. | 30 |
| A12 | Polydimethylsiloxane | 300 | 3 | 280° C. | 30 |
| A13 | Polydimethylsiloxane | 500 | 25 | 250° C. | 30 |
| A14 | Polydimethylsiloxane | 500 | 25 | 230° C. | 30 |
| A15 | Polydimethylsiloxane | 500 | 25 | 220° C. | 30 |
| A16 | Polydimethylsiloxane | 100 | 10 | 170° C. | 60 |
| A17 | Polydimethylsiloxane | 100 | 10 | 280° C. | 60 |
| A18 | Polydimethylsiloxane | 300 | 25 | 250° C. | 30 |

TABLE 2-2

| Silica fine particle No. | Properties: BET specific surface area of silica fine particle ($m^2/g$) | Amount of moisture adsorption of silica fine particle ($cm^3/m^2$) | Temperature at which differential coefficient reaches 4000 or more*1 (° C.) | Carbon loss ratio when washed with hexane (%) | Amount of released component*2 (parts by mass) | Particle diameter (nm) |
|---|---|---|---|---|---|---|
| A1 | 85 | 0.03 | 347 | 48 | 6.8 | 15 |
| A2 | 110 | 0.02 | 348 | 39 | 7.2 | 12 |
| A3 | 155 | 0.02 | 349 | 36 | 7.1 | 7 |
| A4 | 80 | 0.03 | 342 | 55 | 9 | 15 |
| A5 | 74 | 0.03 | 340 | 30 | 3.4 | 15 |
| A6 | 96 | 0.05 | 335 | 65 | 17 | 15 |
| A7 | 65 | 0.06 | 334 | 25 | 2.8 | 22 |
| A8 | 65 | 0.06 | 329 | 25 | 2.7 | 22 |
| A9 | 65 | 0.06 | 325 | 25 | 2.8 | 22 |
| A10 | 65 | 0.06 | 325 | 10 | 1 | 22 |
| A11 | 65 | 0.08 | 320 | 10 | 1 | 22 |
| A12 | 65 | 0.08 | 310 | 10 | 1 | 22 |
| A13 | 40 | 0.13 | 300 | 70 | 20 | 22 |
| A14 | 40 | 0.14 | 290 | 70 | 21 | 22 |
| A15 | 40 | 0.14 | 278 | 70 | 22 | 22 |
| A16 | 85 | 0.03 | 260 | 64 | 10 | 15 |

TABLE 2-2-continued

| | Properties | | | | | |
|---|---|---|---|---|---|---|
| Silica fine particle No. | BET specific surface area of silica fine particle ($m^2/g$) | Amount of moisture adsorption of silica fine particle ($cm^3/m^2$) | Temperature at which differential coefficient reaches 4000 or more*1 (° C.) | Carbon loss ratio when washed with hexane (%) | Amount of released component*2 (parts by mass) | Particle diameter (nm) |
| A17 | 85 | 0.03 | 275 | 75 | 8 | 15 |
| A18 | 40 | 0.14 | 245 | 3 | 3 | 22 |

*1Temperature at which the differential coefficient (graph slope) of a nine-point moving average of integrated values integrated from 35° C. reaches 4000 or more for the intensity of an ion having a mass number (M/z) of 207

*2"Amount of released component" indicates an amount (parts by mass) of a released component on a carbon basis for the silica fine particle.

In the table, particle diameter means number average particle diameter.

Silica Fine Particle B1 Production Example 500 g of fumed silica with a number-average particle diameter of 120 nm (the silica fine particle substrate) was introduced into a stainless steel (SUS304) reactor connected to a vacuum pump. The pressure in the reactor was reduced to 0.001 Pa and heating and stirring were carried out with the temperature of the reactor controlled to 330° C.

A degassing treatment was run for 30 minutes under these conditions; then, while introducing a vapor of octamethylcyclotetrasiloxane as the surface treatment agent and supplying same at 6 g/minute, the aperture on the valve between the vacuum pump and the reactor was adjusted to control the pressure in the reactor to 1 Pa. A surface treatment was performed on the silica fine particle substrate under these conditions by stirring and heating for 20 minutes. The amount of octamethylcyclotetrasiloxane introduced in this step was a total of 120 g.

Then, the interior of the reactor was pumped down to 0.001 Pa in order to remove reaction products and unreacted surface treatment agent. After a degassing treatment under these conditions for 30 minutes, the octamethylcyclotetrasiloxane vapor surface treatment agent was again introduced at a supply rate of 6 g/minute while controlling the pressure in the reactor to 1 Pa. A second surface treatment was performed on the silica fine particles by heating and stirring under these conditions for 20 minutes. The amount of octamethylcyclotetrasiloxane introduced in this step was a total of 120 g.

After carrying out a degassing treatment under these conditions for 30 minutes, the octamethylcyclotetrasiloxane vapor surface treatment agent was again introduced at a supply rate of 6 g/minute while controlling the pressure in the reactor to 1 Pa. A third surface treatment was performed on the silica fine particles by heating and stirring under these conditions for 20 minutes. The amount of octamethylcyclotetrasiloxane introduced in this step was a total of 120 g. Then, while continuing the same heating and stirring, the interior of the reactor was pumped down to 0.001 Pa in order to remove unreacted surface treatment agent, thereby yielding the silica fine particle B1. The average circularity of silica fine particles B1 was 0.945.

Production Examples of Silica Fine Particles B2 and B3

Silica fine particles B2 and B3 were produced in the same way as for silica fine particle B1, except that the number average particle diameter of the fumed silica (silica fine particle substrate) was changed as shown in Table 3. Physical properties of silica fine particles B2 and B3 are shown in Table 3.

TABLE 3

| | Properties | |
|---|---|---|
| Silica fine particle No. | Particle diameter (nm) | Average circularity |
| B1 | 120 | 0.945 |
| B2 | 100 | 0.943 |
| B3 | 80 | 0.932 |

Example 1

Production Examples of Toner 1

| | |
|---|---|
| Binder resin 1 | 100 parts |
| Paraffin wax (melting point: 78° C.) | 4 parts |
| Nipex 35 (Carbon black) | 6 parts |

The materials listed above were preliminarily mixed using a Henschel mixer (product name: Model FM-10C, Nippon Coke & Engineering Co., Ltd.), followed by melt-kneading at 160° C. using a twin-screw kneader extruder.

The resulting kneaded material was cooled and coarsely pulverized using a hammer mill and was subsequently finely pulverized using a Turbo mill.

The obtained finely pulverized material was classified using a Coanda effect-based multi-grade classifier to obtain a toner particle 1 having a weight-average particle diameter (D4) of 6.5 fun.

Next, silica fine particle B1 were externally added to the obtained toner particle 1 as a first external addition treatment in the manner described below.

Toner particle 1: 100 parts

Silica fine particle B1: 4.0 parts

The materials listed above were mixed using a Henschel mixer. Operating conditions of the Henschel mixer were a rotational speed of 4000 rpm, a rotation time of 2 minutes and a heating temperature of room temperature.

Figure 2:
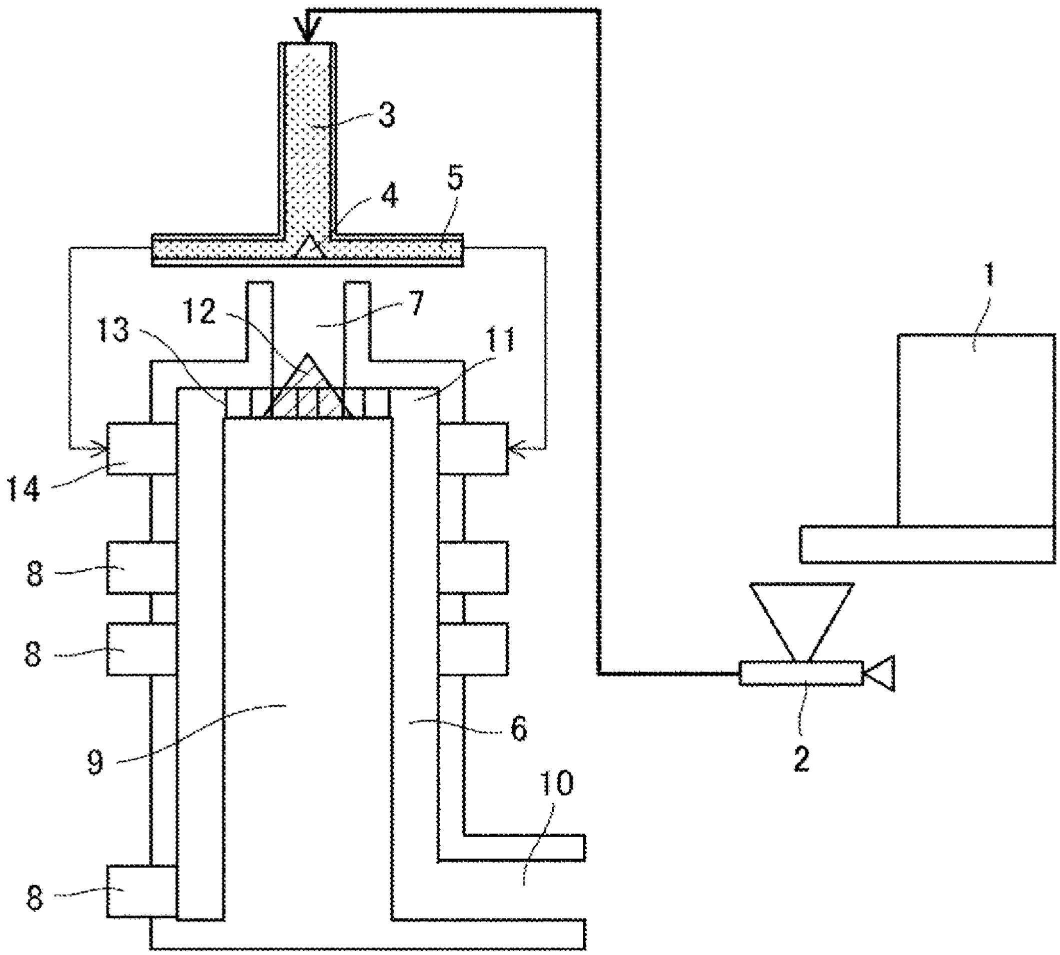
FIG. 2 is a schematic view of a heat treatment apparatus.

Next, a heat treatment was carried out using a surface heat treatment apparatus shown in FIG. 2, and a part of the silica fine particle B1 was embedded at the toner particle surface. Operating conditions of the surface heat treatment apparatus were a feed rate of 1.0 kg/hr, a hot air current temperature of 180° C., a hot air current flow rate of 1.4 $m^3$/min, a cold air current temperature of 3° C., and a cold air current flow rate of 1.2 $m^3$/min.

Next, fine powders and coarse powders were classified and removed using wind force classifier using the Coanda effect (an Elbow Jet Labo EJ-L3 produced by Nittetsu Mining Co., Ltd.) so as to obtain toner particle 1 having silica fine particle B1 embedded at the surface thereof. Next, silica fine particle A1 was externally added to the thus obtained heat treated toner particle 1 as a second external addition treatment in the manner described below.

Toner particle 1 having silica fine particle B1 embedded in surface thereof: 100 parts Silica fine particle A1: 1.6 parts These materials were mixed using a Henschel mixer (product name: Model FM-10C, Nippon Coke & Engineering Co., Ltd.) at a rotation rate of 67 $s^{-1}$ (4,000 rpm) for a rotation time of 2 min and at an external addition temperature of room temperature; this was followed by passage across an ultrasound vibrating screen with an aperture of 54 μm to provide the toner 1. The degree of embedding of silica fine particle B1 in the obtained toner 1 is shown in Table 4.

Magnetic Carrier Core Particle 1 Production Example

Step 1 (Weighing and Mixing Step)

| | |
|---|---|
| $Fe_2O_3$ | 68.3 mass % |
| $MnCO_3$ | 28.5 mass % |
| $Mg(OH)_2$ | 2.0 mass % |
| $SrCO_3$ | 1.2 mass % |

These ferrite starting materials were weighed out; 20 parts water was added to parts of the ferrite starting materials; and a slurry was then prepared by wet mixing for 3 hours using a ball mill and zirconia with a diameter (ø) of 10 mm. The solids fraction concentration in the slurry was 80 mass %.

Step 2 (Prefiring Step)

The mixed slurry was dried using a spray dryer (Ohkawara Kakohki Co., Ltd.), followed by firing in a batch electric furnace for 3.0 hours at a temperature of 1050° C. in a nitrogen atmosphere (1.0 volume % oxygen concentration) to produce a prefired ferrite.

Step 3 (Pulverization Step)

The prefired ferrite was pulverized to approximately 0.5 mm using a crusher, and water was then added to prepare a slurry. The solids fraction concentration of this slurry was brought to 70 mass %. Milling was carried out for 3 hours using a wet ball mill and ⅛-inch stainless steel beads to obtain a slurry. This slurry was additionally milled for 4 hours using a wet bead mill and zirconia with a diameter of 1 mm to obtain a prefired ferrite slurry having a 50% particle diameter on a volume distribution basis (D50) of 1.3 μm.

Step 4 (Granulation Step)

1.0 parts of ammonium polycarboxylate as a dispersing agent and 1.5 parts of polyvinyl alcohol as a binder were added to 100 parts of the prefired ferrite slurry, followed by granulation into spherical particles and drying using a spray dryer (Ohkawara Kakohki Co., Ltd.). The particle size of the obtained granulate was adjusted followed by heating for 2 hours at 700° C. using a rotary electric furnace to remove the organic component, e.g., the dispersing agent and binder.

Step 5 (Firing Step)

The granulate was fired in a nitrogen atmosphere (1.0 volume % oxygen concentration) using 2 hours for the time from room temperature to the firing temperature (1100° C.) and holding for 4 hours at the temperature of 1100° C. This was followed by dropping the temperature to a temperature of 60° C. over 8 hours, returning the nitrogen atmosphere to the atmosphere, and removing the fired material at a temperature not above 40° C.

Step 6 (Screening Step)

The aggregated particles in the resulting fired material were crushed; the coarse particles were then removed by screening across a screen with an aperture of 150 μm; the fines were removed using air classification; and the weakly magnetic component was removed by magnetic screening to obtain a porous magnetic core particle 1.

Step 7 (Filling Step)

100 parts of the porous magnetic core particle 1 was introduced into the stirring container of a mixer/stirrer (Model NDMV All-Purpose Stirrer, Dalton Corporation), and 5 parts of a fill resin, comprising 95.0 mass % methylsilicone oligomer and 5.0 mass % γ-aminopropyltrimethoxysilane, was added dropwise at normal pressure while holding the temperature at 60° C.

After completion of the dropwise addition, stirring was continued while adjusting the time, and the temperature was raised to 70° C. to fill the resin composition into the individual porous magnetic core particles.

After cooling, the resulting resin-filled magnetic core particles were transferred to a mixer having a spiral impeller in a rotatable mixing container (Model UD-AT drum mixer, Sugiyama Heavy Industrial Co., Ltd.), and the temperature was raised under a nitrogen atmosphere at a ramp rate of 2° C./minute to 140° C. while stirring. This was followed by continuing to heat and stir at 140° C. for 50 minutes.

This was followed by cooling to room temperature, removal of the cured resin-filled ferrite particles, and removal of the nonmagnetic material using a magnetic screener. The coarse particles were removed using a vibrating screen to obtain a resin-filled magnetic carrier core particle 1.

Coating Resin Production Example

| | |
|---|---|
| Cyclohexyl methacrylate monomer | 26.8 mass % |
| Methyl methacrylate monomer | 0.2 mass % |
| Methyl methacrylate macromonomer | 8.4 mass % |

(Macromonomer having the methacryloyl group at one terminal and having a weight-average molecular weight of 5,000; this is given by Formula (B) wherein A is a polymer of methyl methacrylate)

| | |
|---|---|
| Toluene | 31.3 mass % |
| Methyl ethyl ketone | 31.3 mass % |
| Azobisisobutyronitrile | 2.0 mass % |

Of these materials, the cyclohexyl methacrylate monomer, methyl methacrylate monomer, methyl methacrylate macromonomer, toluene, and methyl ethyl ketone were introduced into a four-neck separable flask fitted with a reflux condenser, thermometer, nitrogen introduction line, and stirrer. Nitrogen gas was introduced into the separable flask to thoroughly establish a nitrogen atmosphere, and this was followed by heating to the addition of the azobisisobutyronitrile, and polymerization for 5 hours under reflux.

Hexane was poured into the resulting reaction product to precipitate the copolymer.

The resulting precipitate was separated by filtration and vacuum dried to obtain a resin.

30 parts of this resin was dissolved in a mixed solvent of 40 parts of toluene and 30 parts of methyl ethyl ketone to obtain a resin solution (solids concentration=30%).

Coating Resin Solution Production

| | |
|---|---|
| Resin solution (30% solids concentration) | 33.3 mass % |
| Toluene | 66.4 mass % |
| Carbon black (Regal 330, Cabot Corporation) | 0.3 mass % |

(Number-average primary particle diameter: 25 nm, specific surface area by nitrogen adsorption: 94 $m^2/g$, DBP absorption: 75 mL/100 g)

The materials listed above were introduced into a paint shaker and were dispersed for 1 hour using zirconia beads having a diameter of 0.5 mm. The obtained dispersion was filtered across a 5.0 μm membrane filter to obtain a coating resin solution.

Magnetic Carrier 1 Production Example

The coating resin solution and the magnetic carrier core particles (the amount of introduction of the coating resin solution was 2.5 parts as the resin component per 100 parts of the magnetic carrier core particle 1) were introduced into a vacuum-degassing kneader being maintained at normal temperature.

After the introduction, stirring was performed for 15 minutes at a stirring rate of 30 rpm and the solvent was evaporated by at least a prescribed amount (80%) followed by raising the temperature to 80° C. while mixing under reduced pressure, distilling off the toluene over 2 hours, and cooling.

The low magnetic force product was separated from the resulting magnetic carrier using a magnetic force screening, and the magnetic carrier was then passed through a sieve having an aperture of 70 fun and was classified using a wind force classifier to obtain a magnetic carrier 1 having a 50% particle diameter (D50) on a volume distribution basis of 38.2 μm.

Two-Component Developer 1 Production, and Evaluations

A two-component developer 1 was produced by mixing the toner 1 and the magnetic carrier 1 so as to provide a toner concentration of 8.0 mass %; mixing was performed using a V-mixer (Model V-10, Tokuju Kosakusho Co., Ltd.) at 0.5 s−1 for a rotation time of 5 minutes. The following evaluations were carried out using the obtained two-component developer 1.

Evaluations

An imagePRESS C850 (Canon, Inc.) was used as the image-forming machine; the fixing unit was removed to the exterior, the fixation temperature was made freely controllable, and the image-forming speed was modified so as to output 105 prints/minute in A4 size. In addition, the development contrast was made adjustable by any value and autocorrection by the main unit was disengaged. The frequency of the alternating electric field was fixed at 2.0 kHz, and the peak-to-peak voltage (Vpp) was configured so the Vpp could be varied in 0.1 kV steps from 0.7 kV to 1.8 kV.

The two-component developer 1 was introduced into the developing device at the cyan position of this image-forming machine, the charging voltage VD of the electrostatic latent image bearing member and the laser power were adjusted, and the following evaluations were performed. The evaluation was performed at two levels in each of the evaluations: an image-forming speed of 105 prints/min at A4 size and an image-forming speed of 85 prints/min at A4 size.

White paper (product name: CS-814 (A4, 81.4 $g/m^2$), Canon Marketing Japan Inc.) was used as the evaluation paper.

In the following evaluations, an FFH is a value that presents 256 gradations in hexadecimal format, with OOH being the 1st gradation (white background region) of the 256 gradations and FFH being the 256th gradation (solid region) of the 256 gradations.

Evaluation of Charge Maintaining Properties

Charge maintaining properties were evaluated in terms of developing performance before and after continuous printing.

In a normal temperature normal humidity environment (temperature 25° C., relative humidity 50%), the initial Vpp was set to 1.3 kV, and the contrast potential was set so that the reflection density of a black monochrome solid image was 1.50. At these settings, 100,000 consecutive sheets of an image pattern with a black monochrome image ratio of 5% were outputted onto a paper surface, after which a black monochrome solid image was outputted again at a Vpp of 1.3 kV, the reflection density was measured, the contrast potential at which the reflection density of the black monochrome solid image was 1.50 was determined, and the difference between the initial value and the value after outputting was compared. Reflection density was measured using a spectral densitometer (a 500 Series produced by X-Rite).

Evaluation criteria for developing performance: As charge maintaining properties deteriorate, the difference between initial and after outputting increases.

A: Difference between initial value and value after outputting: less than 40 V

B: Difference between initial value and value after outputting: 40 V or more and less than 50 V C: Difference between initial value and value after outputting: 50 V or more and less than 60 V D: Difference between initial value and value after outputting: 60 V or more and less than 70 V E: Difference between initial value and value after outputting: 70 V or more and less than 80 V F: Difference between initial value and value after outputting: 80 V or more and less than 90 V G: Difference between initial value and value after outputting: 90 V or more and less than 100 V H: Difference between initial value and value after outputting: 100 V or more Evaluation of Transfer Voids In a normal temperature normal humidity environment (temperature 25° C., relative humidity 50%), the developing voltage was initially adjusted so that the toner laid-on level of a FFh image was 0.45 $mg/cm^2$. FFh is a value that indicates 256 colors as 16 binary numbers, with 00h denoting the 1st gradation (a white background part), and FFh denoting the 256th gradation (a solid part).

200 solid images were continuously outputted at a print percentage of 100% and fresh toner was supplied to the developing apparatus from a toner bottle/hopper. Immediately thereafter, one print of a 500 μm horizontal line pattern was outputted, an image was acquired by magnifying a fine line using a digital microscope, binarization was carried out, and the amount of voids occurring within the line width was calculated as the void ratio in terms of areal ratio. For example, a void ratio of 50% means that 50% of the white background part could be seen within the line width. Transfer voids were evaluated using the following evaluation criteria.

A: Void ratio less than 1.0%

B: Void ratio 1.0% or more and less than 4.0%

C: Void ratio 4.0% or more and less than 8.0%

D: Void ratio 8.0% or more and less than 12.0%

E: Void ratio 12.0% or more and less than 16.0%

F: Void ratio 16.0% or more and less than 20.0%

G: Void ratio 20.0% or more

Evaluation of Charging Unevenness Caused by Member Contamination

Charging unevenness caused by member contamination was evaluated in terms of image in-plane uniformity after continuous printing and charging wire contamination.

Immediately after carrying out a 200,000 print durability test in a normal temperature normal humidity environment (temperature 25° C., relative humidity 50%) with an FFH output chart having an image ratio of 5%, 10 prints of an FFH output chart having an image ratio of 40% were outputted. Next, one print of a 99H output chart having an image ratio of 100% (a half tone image covering an entire A4 sheet) was outputted.

Image in-plane uniformity was assessed by measuring image density using a spectral densitometer (500 series produced by X-Rite).

Measurement positions were as follows.

0.5 cm from the top edge of the image (the first printed edge) and 5.0 cm, 15.0 cm and 25.0 cm from the left edge of the image (with the first printed edge at the top); 7.0 cm from the top edge of the image and 5.0 cm, 15.0 cm and 25.0 cm from the left edge of the image;

14.0 cm from the top edge of the image and 5.0 cm, 15.0 cm and 25.0 cm from the left edge of the image; and 20.0 cm from the top edge of the image and 5.0 cm, 15.0 cm and 25.0 cm from the left edge of the image (a total of 12 locations). The difference between the highest image density and the lowest image density among these 12 locations was determined. In addition, the evaluation result was taken to be the one with the greatest difference in density among 50 prints. In-plane uniformity of obtained images was assessed using the criteria below. The results are shown in Table 6-2.

A: Density difference: less than 0.020
B: Density difference: 0.020 or more and less than 0.030
C: Density difference: 0.030 or more and less than 0.040
D: Density difference: 0.040 or more and less than 0.050
E: Density difference: 0.050 or more and less than 0.060
F: Density difference: 0.060 or more and less than 0.080
G: Density difference: 0.080 or more These evaluation results are shown in Tables 6-1 and 6-2.

Production Examples of Toners 2 and 3

Toners 2 and 3 were obtained in the same way as in the production example of toner 1, except that the type of silica fine particle was altered as shown in Table 4.

Production Example of Toner 4

Binder resin 1: 100 parts
Paraffin wax (melting point 78° C.): 4 parts
Nipex 35 (carbon black): 6 parts The materials listed above were pre-mixed using a Henschel mixer (an FM-10C produced by Nippon Coke and Engineering Co., Ltd.) and then melt kneaded at 160° C. using a twin screw kneading extruder.

The obtained kneaded product was cooled, coarsely pulverized using a hammer mill, and then finely pulverized using a Turbo Mill.

The obtained finely pulverized product was classified using a multiple section sorting apparatus using the Coanda effect, thereby obtaining toner particle 2, which had a weight average particle diameter (D4) of 6.5 μm.

Silica fine particles A1 and B1 were externally added to the obtained toner particle 2 in the manner described below.

Toner particle 2: 100 parts
Silica fine particle A1: 1.6 parts
Silica fine particle B1: 4.0 parts Toner 4 was obtained by mixing the materials listed above using a Henschel mixer (FM-10C produced by Nippon Coke and Engineering Co., Ltd.) at a speed of rotation of 67 $s^{-1}$ (4000 rpm), a rotation time of 2 minutes and an external addition temperature of room temperature, and then passing the obtained mixture through an ultrasonic vibration sieve having an opening size of 54 μm.

Production Examples of Toners 5 and 6

Toners 5 and 6 were obtained in the same way as in the production example of toner 4, except that the type of silica fine particle was altered as shown in Table 4.

Production Example of Toner 7

Binder resin 1: 100 parts
Paraffin wax (melting point 78° C.): 4 parts
Nipex 35 (carbon black): 6 parts The materials listed above were pre-mixed using a Henschel mixer (an FM-10C produced by Nippon Coke and Engineering Co., Ltd.) and then melt kneaded at 160° C. using a twin screw kneading extruder.

The obtained kneaded product was cooled, coarsely pulverized using a hammer mill, and then finely pulverized using a Turbo Mill.

The obtained finely pulverized product was classified using a multiple section sorting apparatus using the Coanda effect, thereby obtaining toner particle 3, which had a weight average particle diameter (D4) of 6.5 μm.

Silica fine particle A1 were externally added to the obtained toner particle 3 in the manner described below.

Toner particle 3: 100 parts
Silica fine particle A1: 1.6 parts

Toner 7 was obtained by mixing the materials listed above using a Henschel mixer (FM-10C produced by Nippon Coke and Engineering Co., Ltd.) at a speed of rotation of 67 $s^{-1}$ (4000 rpm), a rotation time of 2 minutes and an external addition temperature of room temperature, and then passing the obtained mixture through an ultrasonic vibration sieve having an opening size of 54 fun.

Production Examples of Toners 8 to 22

Toners 8 to 22 were obtained in the same way as in the production example of toner 7, except that the type of silica fine particle was altered as shown in Table 4.

TABLE 4

| Toner | Silica fine particle A No. | Silica fine particle B No. | The degree of embedding of silica fine particle B (%) | D4 |
|---|---|---|---|---|
| 1 | 1 | 1 | 16 | 6.5 |
| 2 | 2 | 1 | 16 | 6.5 |
| 3 | 3 | 1 | 16 | 6.5 |
| 4 | 1 | 1 | 1 or less | 6.5 |
| 5 | 1 | 2 | 1 or less | 6.5 |
| 6 | 1 | 3 | 1 or less | 6.5 |
| 7 | 1 | — | — | 6.5 |
| 8 | 4 | — | — | 6.5 |
| 9 | 5 | — | — | 6.5 |
| 10 | 6 | — | — | 6.5 |
| 11 | 7 | — | — | 6.5 |
| 12 | 8 | — | — | 6.5 |
| 13 | 9 | — | — | 6.5 |
| 14 | 10 | — | — | 6.5 |
| 15 | 11 | — | — | 6.5 |
| 16 | 12 | — | — | 6.5 |
| 17 | 13 | — | — | 6.5 |
| 18 | 14 | — | — | 6.5 |
| 19 | 15 | — | — | 6.5 |
| 20 | 16 | — | — | 6.5 |
| 21 | 17 | — | — | 6.5 |
| 22 | 18 | — | — | 6.5 |

In the table, D4 means weight average particle diameter of the toner (μm).

Magnetic Carrier 2 Production Example

A magnetic carrier 2 was obtained proceeding as in the Magnetic Carrier 1 Production Example, but changing the material of the coating resin as follows.

| | |
|---|---|
| Cyclohexyl methacrylate monomer | 26.8 mass % |
| Methyl methacrylate monomer | 8.6 mass % |
| Toluene | 31.3 mass % |
| Methyl ethyl ketone | 31.3 mass % |
| Azobisisobutyronitrile | 2.0 mass % |

Magnetic Carrier 3 Production Example

A magnetic carrier 3 was obtained proceeding as in the Magnetic Carrier 1 Production Example, but changing the material of the coating resin as follows.

| | |
|---|---|
| Methyl methacrylate monomer | 35.4 mass % |
| Toluene | 31.3 mass % |
| Methyl ethyl ketone | 31.3 mass % |
| Azobisisobutyronitrile | 2.0 mass % |

Two-Component Developers 2 to 22 Production Example

Two-component developers 2 to 22 were obtained proceeding as in the production example for developer 1, but changing the magnetic carrier and toner as shown in Table 5.

TABLE 5

| Two-component developer | Toner | Carrier |
|---|---|---|
| 1 | 1 | 1 |
| 2 | 2 | 1 |
| 3 | 3 | 1 |
| 4 | 4 | 1 |
| 5 | 5 | 2 |
| 6 | 6 | 3 |
| 7 | 7 | 3 |
| 8 | 8 | 3 |
| 9 | 9 | 3 |
| 10 | 10 | 3 |
| 11 | 11 | 3 |
| 12 | 12 | 3 |
| 13 | 13 | 3 |
| 14 | 14 | 3 |
| 15 | 15 | 3 |
| 16 | 16 | 3 |
| 17 | 17 | 3 |
| 18 | 18 | 3 |
| 19 | 19 | 3 |
| 20 | 20 | 3 |
| 21 | 21 | 3 |
| 22 | 22 | 3 |

Evaluations

Evaluations were performed as in Example 1, but using two-component developers 2 to 22. The results of the evaluations are given in Table 6-1 and Table 6-2.

TABLE 6-1

| Evaluation | | Evaluation of charge maintaining properties | | | | Evaluation of transfer voids | | | |
|---|---|---|---|---|---|---|---|---|---|
| | | Image formation speed | | | | Speed | | | |
| | | 85 prints/min | | 105 prints/min | | 85 prints/min | | 105 prints/min | |
| Example/ Comparative Example | Two-component developer No. | Potential difference | Assessment | Potential difference | Assessment | Void rate | Assessment | Void rate | Assessment |
| Example 1 | 1 | 20 | A | 23 | A | 0.1 | A | 0.2 | A |
| Example 2 | 2 | 20 | A | 23 | A | 0.1 | A | 0.2 | A |
| Example 3 | 3 | 20 | A | 23 | A | 0.1 | A | 0.2 | A |
| Example 4 | 4 | 23 | A | 28 | A | 0.2 | A | 1.0 | B |
| Example 5 | 5 | 25 | A | 43 | B | 0.3 | A | 1.1 | B |
| Example 6 | 6 | 26 | A | 53 | C | 0.3 | A | 1.2 | B |
| Example 7 | 7 | 29 | A | 60 | D | 0.4 | A | 2.2 | B |
| Example 8 | 8 | 29 | A | 63 | D | 0.4 | A | 3.9 | B |
| Example 9 | 9 | 30 | A | 64 | D | 0.4 | A | 3.9 | B |
| Example 10 | 10 | 31 | A | 66 | D | 0.5 | A | 6.0 | C |
| Example 11 | 11 | 32 | A | 67 | D | 0.5 | A | 9.2 | D |
| Example 12 | 12 | 32 | A | 68 | D | 0.5 | A | 10.4 | D |
| Example 13 | 13 | 32 | A | 70 | E | 0.5 | A | 10.6 | D |
| Example 14 | 14 | 33 | A | 70 | E | 0.5 | A | 12.0 | E |
| Example 15 | 15 | 35 | A | 80 | F | 0.7 | A | 12.1 | E |
| Example 16 | 16 | 35 | A | 81 | F | 0.7 | A | 12.3 | E |
| Example 17 | 17 | 35 | A | 82 | F | 0.7 | A | 12.5 | E |
| Example 18 | 18 | 38 | A | 85 | F | 0.9 | A | 13.2 | E |
| Example 19 | 19 | 38 | A | 90 | G | 0.9 | A | 13.5 | E |
| Comparative Example 1 | 20 | 38 | A | 93 | G | 0.9 | A | 14.0 | E |
| Comparative Example 2 | 21 | 50 | C | 96 | G | 2.5 | B | 17.0 | F |
| Comparative Example 3 | 22 | 93 | G | 105 | H | 15.0 | E | 21.0 | G |

TABLE 6-2

| Evaluation | | Evaluation of charging unevenness caused by member contamination | | | |
|---|---|---|---|---|---|
| | Two-component | Speed | | | |
| | | 85 prints/min | | 105 prints/min | |
| Example/Comparative Example | developer No. | Density difference | Assessment | Density difference | Assessment |
| Example 1 | 1 | 0.005 | A | 0.005 | A |
| Example 2 | 2 | 0.005 | A | 0.005 | A |
| Example 3 | 3 | 0.005 | A | 0.005 | A |
| Example 4 | 4 | 0.009 | A | 0.010 | A |
| Example 5 | 5 | 0.009 | A | 0.011 | A |
| Example 6 | 6 | 0.009 | A | 0.011 | A |
| Example 7 | 7 | 0.010 | A | 0.022 | B |
| Example 8 | 8 | 0.011 | A | 0.023 | B |
| Example 9 | 9 | 0.011 | A | 0.024 | B |
| Example 10 | 10 | 0.011 | A | 0.028 | B |
| Example 11 | 11 | 0.012 | A | 0.029 | B |
| Example 12 | 12 | 0.012 | A | 0.036 | C |
| Example 13 | 13 | 0.013 | A | 0.036 | C |
| Example 14 | 14 | 0.013 | A | 0.038 | C |
| Example 15 | 15 | 0.016 | A | 0.039 | C |
| Example 16 | 16 | 0.016 | A | 0.048 | D |
| Example 17 | 17 | 0.016 | A | 0.055 | E |
| Example 18 | 18 | 0.018 | A | 0.065 | F |
| Example 19 | 19 | 0.018 | A | 0.070 | F |
| Comparative Example 1 | 20 | 0.019 | A | 0.120 | G |
| Comparative Example 2 | 21 | 0.065 | F | 0.130 | G |
| Comparative Example 3 | 22 | 0.075 | F | 0.140 | G |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2022-075101, filed Apr. 28, 2022 which is hereby incorporated by reference herein in its entirety.

What is claimed is:

1. A toner, comprising:

a toner particle; and silica fine particle A on a surface of the toner particle, silica fine particle A having a compound with a siloxane structure at a surface thereof;

the toner having a weight average particle diameter of 4.0 to 15.0 μm; and a carbon loss ratio when the silica fine particle A is washed with hexane being 5 to 70%, wherein a temperature at which a differential coefficient of a nine-point moving average of integrated values integrated from 35° C. reaches 4000 or more for an intensity of an obtained ion having a mass number (M/z) of 207 is 270° C. or higher, when mass spectrometry is carried out at a sampling interval of 0.4 seconds while heating the silica fine particle A as described below (i) 7.0 mg of the silica fine particle A is heated from 35° C. at a temperature increase rate of 20° C./min in a nitrogen atmosphere, (ii) gas generated as a temperature increased is ionized at an ionization current of 50 μA and an ionization energy of 70 eV, and (iii) components contained in the ionized gas are subjected to mass spectrometry at an EM voltage of 1000 V using a quadrupole mass spectrometer.

2. The toner according to claim 1, wherein silica fine particle A has a BET specific surface area of 60 to 160 $m^2/g$.

3. The toner according to claim 1, wherein silica fine particle A has 0.01 to 0.07 $cm^3/m^2$ moisture adsorption at a temperature of 30° C. and a relative humidity of 80%.

4. The toner according to claim 1, wherein the carbon loss ratio when the silica fine particle A is washed with hexane is 30 to 55%.

5. The toner according to claim 1, wherein an amount of a released component on a carbon basis for the silica fine particle A is 3.0 to 9.0 parts by mass relative to 100 parts by mass of the silica fine particle A.

6. The toner according to claim 1, wherein a primary particle of the silica fine particle A has a number average particle diameter of 5 to 40 nm.

7. The toner according to claim 1, wherein the toner further comprises a silica fine particle B which is different from the silica fine particle A.

8. The toner according to claim 7, wherein silica fine particle B has a primary particle with a number average particle diameter of 50 to 500 nm.

9. The toner according to claim 7, wherein the primary particle of the silica fine particle B has the number average particle diameter at least 50 nm greater than the number average particle diameter of the primary particle of the silica fine particle A.

10. The toner according to claim 1, wherein a content of the silica fine particle A is 0.2 to 3.0 parts by mass relative to 100 parts by mass of the toner particle.

11. The toner according to claim 1, wherein the silica fine particle A is treated with silicone oil.

12. A two-component developer, comprising:

the toner according to claim 1; and a magnetic carrier comprising a magnetic carrier core particle and a resin coating layer on a surface of the magnetic carrier core particle, the resin in the resin coating layer comprising a monomer unit provided by a (meth)acrylic acid ester having an alicyclic hydrocarbon group.

13. The two-component developer according to claim 12, wherein the resin in the resin coating layer comprises a monomer unit provided by a macromonomer represented by formula (B)

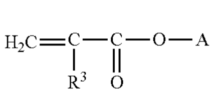

(B)

where A denotes a polymer of at least one compound selected from the group consisting of methyl acrylate, methyl methacrylate, butyl acrylate, butyl methacrylate, 2-ethylhexyl acrylate, 2-ethylhexyl methacrylate, styrene, acrylonitrile and methacrylonitrile, and $R^3$ is H or $CH_3$.

14. A production method to obtain the toner according to claim 1, comprising the steps of:

mixing a silica fine particle substrate with a cyclic siloxane and carrying out a heat treatment at a temperature of 300° C. or higher to obtain a surface-treated material;

treating the surface-treated material with a silicone oil to obtain silica fine particle A; and mixing the silica fine particle A with a toner particle to obtain the toner.

15. The toner production method according to claim 14, wherein the surface-treated material is treated with the silicone oil at a temperature of 300° C. or higher.

* * * * *